United States Patent
Grondahl et al.

(10) Patent No.: US 8,474,827 B2
(45) Date of Patent: Jul. 2, 2013

(54) FILM RIDING PRESSURE ACTUATED LEAF SEAL ASSEMBLY

(75) Inventors: Clayton M. Grondahl, Rexford, NY (US); Richard Lee Smith, Clifton Park, NY (US); James Carlton Dudley, Cincinnati, OH (US)

(73) Assignee: CMG Tech, LLC, Rexford, NY (US)

( * ) Notice: Subject to any disclaimer, the term of this patent is extended or adjusted under 35 U.S.C. 154(b) by 368 days.

(21) Appl. No.: 12/814,417

(22) Filed: Jun. 11, 2010

(65) Prior Publication Data
US 2011/0304101 A1 Dec. 15, 2011

(51) Int. Cl.
*F16J 15/44* (2006.01)
*F16J 15/447* (2006.01)

(52) U.S. Cl.
USPC ............................ 277/411; 277/412; 277/421

(58) Field of Classification Search
USPC ................... 277/355, 411–412, 421
See application file for complete search history.

(56) References Cited

U.S. PATENT DOCUMENTS

| | | | |
|---|---|---|---|
| 3,880,550 A | 4/1975 | Corey et al. | |
| 4,274,683 A | 6/1981 | Gray et al. | |
| 4,998,739 A | 3/1991 | Weiler | |
| 5,042,823 A | 8/1991 | Mackay et al. | |
| 5,071,138 A | 12/1991 | Mackay et al. | |
| 5,090,710 A | 2/1992 | Flower | |
| 5,100,158 A | 3/1992 | Gardner | |
| 5,370,402 A | 12/1994 | Gardner et al. | |
| 5,632,493 A | 5/1997 | Gardner | |
| 5,758,879 A | 6/1998 | Flower | |
| 6,161,836 A | 12/2000 | Zhou | |
| 6,364,316 B1 | 4/2002 | Arora | |
| 6,505,837 B1 | 1/2003 | Heshmat | |
| 6,644,667 B2 | 11/2003 | Grondahl | |
| 7,182,345 B2 | 2/2007 | Justak | |
| 7,320,468 B2 | 1/2008 | Morgan | |
| 7,578,509 B2 | 8/2009 | Grondahl | |
| 2004/0150165 A1* | 8/2004 | Grondahl | 277/355 |
| 2007/0096397 A1* | 5/2007 | Justak | 277/355 |
| 2007/0120327 A1* | 5/2007 | Justak | 277/355 |
| 2007/0296158 A1* | 12/2007 | Datta | 277/411 |
| 2008/0042366 A1 | 2/2008 | Awtar et al. | |
| 2008/0061513 A1 | 3/2008 | Awtar et al. | |
| 2008/0131269 A1 | 6/2008 | Deo et al. | |
| 2010/0007093 A1 | 1/2010 | Grondahl | |

OTHER PUBLICATIONS

Grondahl, "Pressure Actuated Leaf Seal Feasibility Study and Demonstration", American Institute of Aeronautics and Astronautics, AIAA-2009-5167, 12 pages.

(Continued)

*Primary Examiner* — Vishal Patel
(74) *Attorney, Agent, or Firm* — Hoffman Warnick LLC

(57) ABSTRACT

In accordance with embodiments of this invention, a pressure actuated leaf seal assembly is provided that includes film riding, hydrodynamic/hydrostatic runners under seal member leaf ends. Leaf seal assemblies according to embodiments of this invention maintain the runner away from a rotating body until adequate rotating speed is present to generate lift required to allow the runner to float on a thin film of operating fluid on the rotating body, so that the runner does not rub the rotating body. In addition, runners are attached, or added, to leaf seal members such that the runners move in a radial direction, while remaining parallel to the rotating body. In one embodiment, a runner can comprise a separate structure coupled to a leaf seal member, and in another embodiment, a runner can comprise a wear-resistant pad on a distal end of a leaf seal member.

15 Claims, 18 Drawing Sheets

OTHER PUBLICATIONS

Foster, "Development of Pressure Actuated Leaf Seals for Improved Turbine Shaft Sealing Feasibility Study", Apr. 2009, 33 pages.

Chupp et al., "Sealing in Turbomachinery", NASA/TM—2006-214341, Aug. 2006, 62 pages.

Grondahl, "Pressure Actuated Leaf Seals for Improved Turbine Shaft Sealing", American Institute of Aeronautics and Astronautics, AIAA-2005-3985, 10 pages.

Shapiro, "Film Riding Brush Seal Preliminary Studies", Tribos Engineering, P.C., NASA Seal Workshop 2002, NASA/CP-2003-212458, vol. 1, pp. 247-265.

Shapiro, "Numerical, Analytical, Experimental Study of Fluid Dynamic Forces in Seals", vol. 2—Description of Gas Seal Codes GCYLT and GFACE., NASA/CR-2004-213199/vol. 2, Oct. 2004, 140 pages.

Copenheaver, International Application No. PCT/US2011/040180, International Search Report and the Written Opinion of the International Searching Authority, Oct. 24, 2011, 17 pages.

Lindner, International application No. PCT/US2011/040180, International Preliminary Report on Patentability and Written Opinion of the International Searching Authority, Dec. 27, 2012, 13 pages.

* cited by examiner

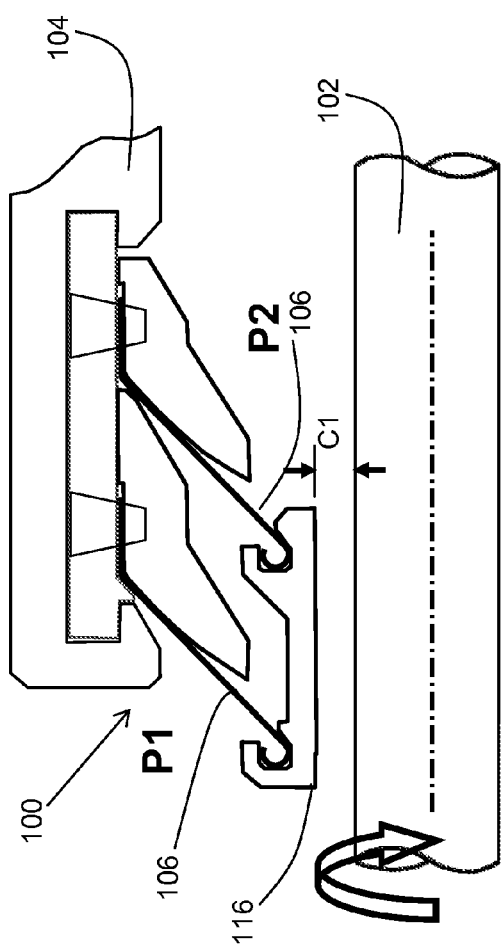
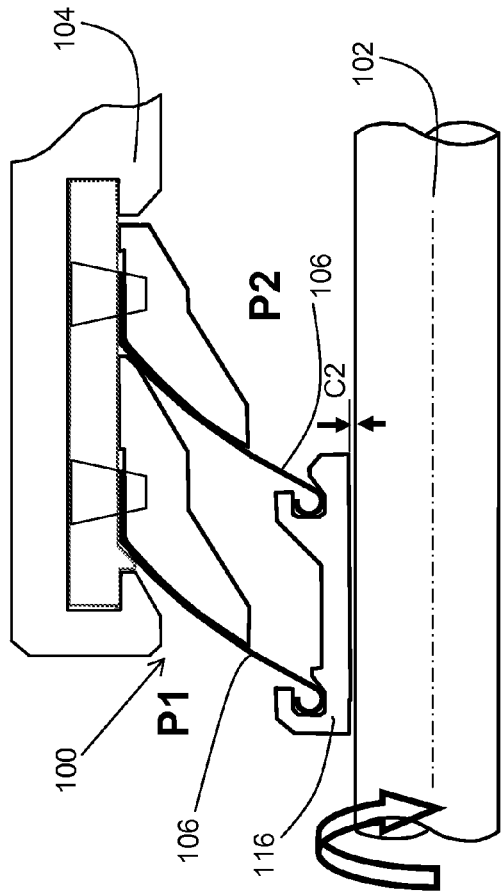

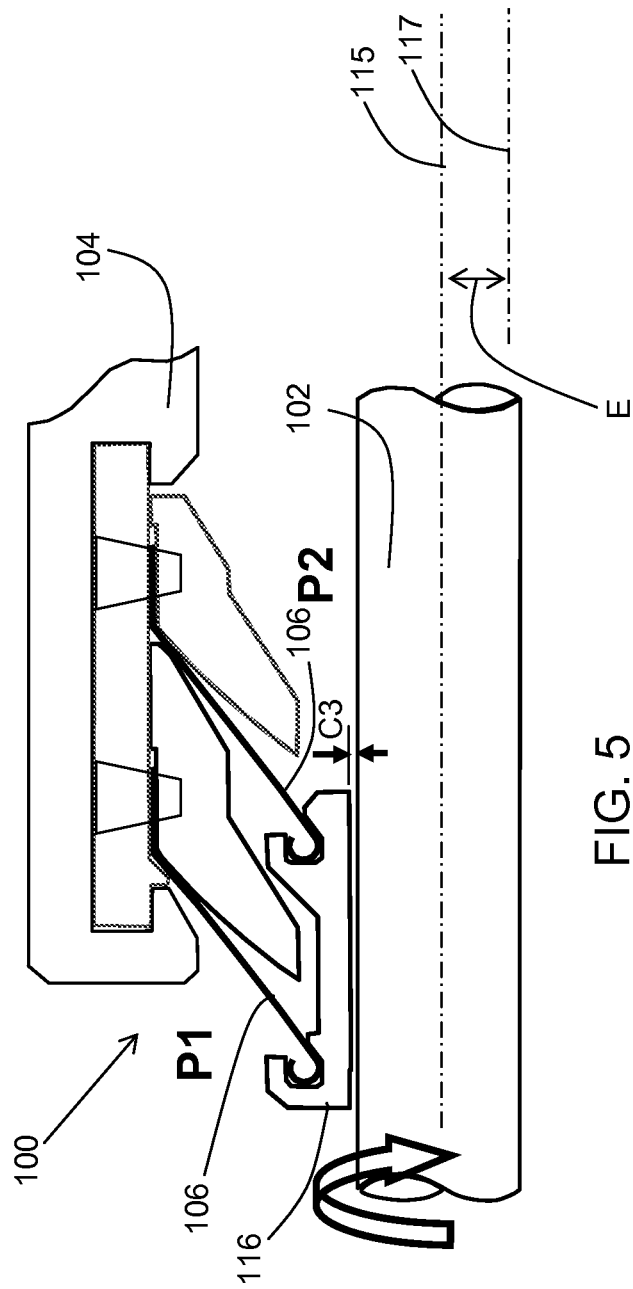

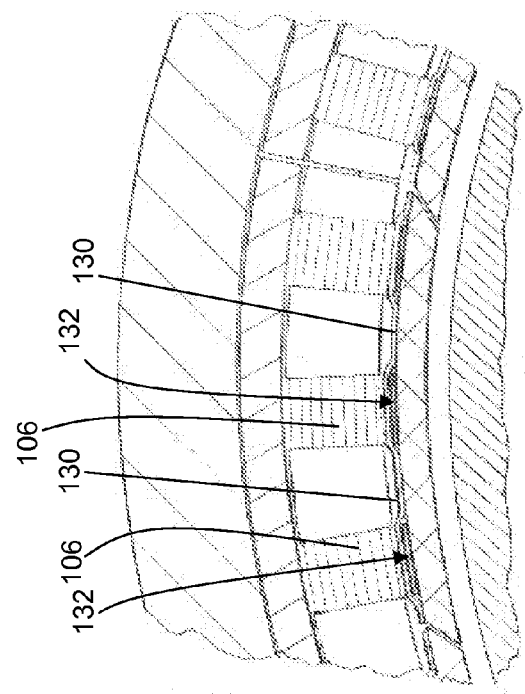

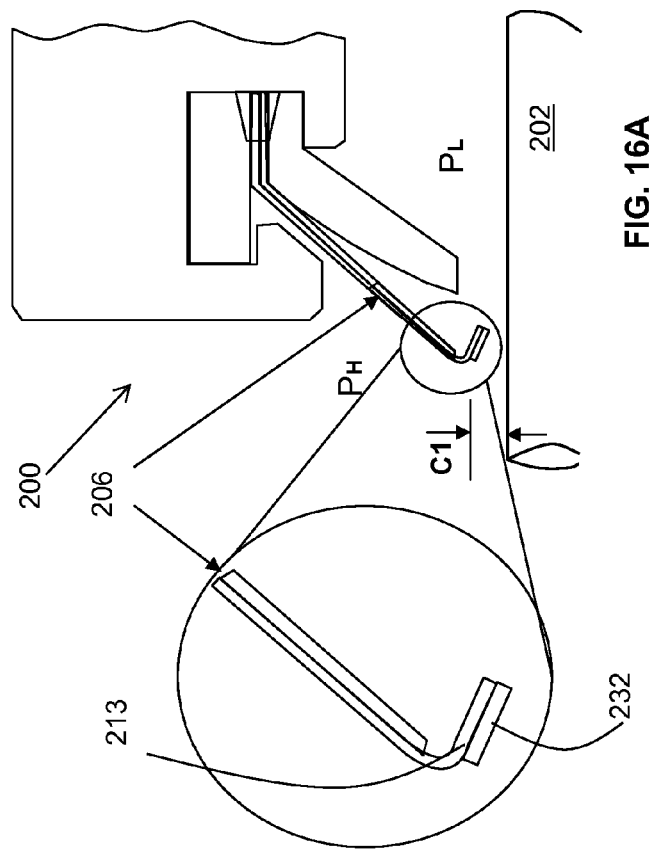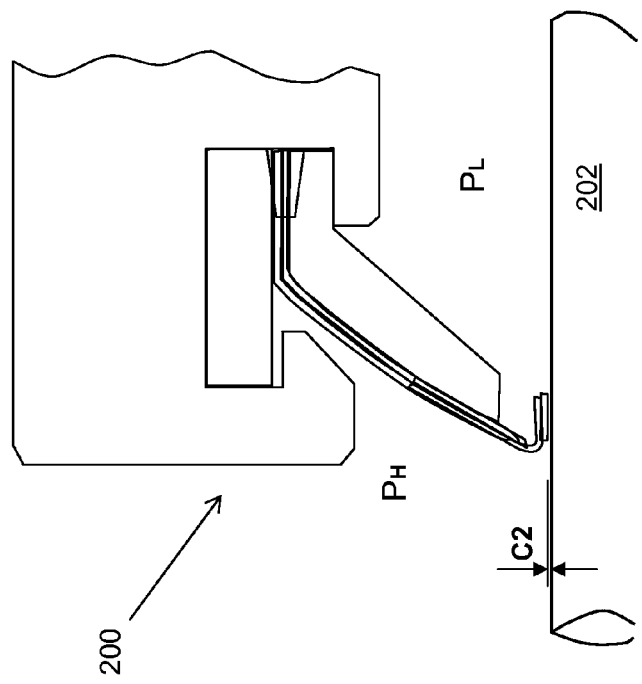

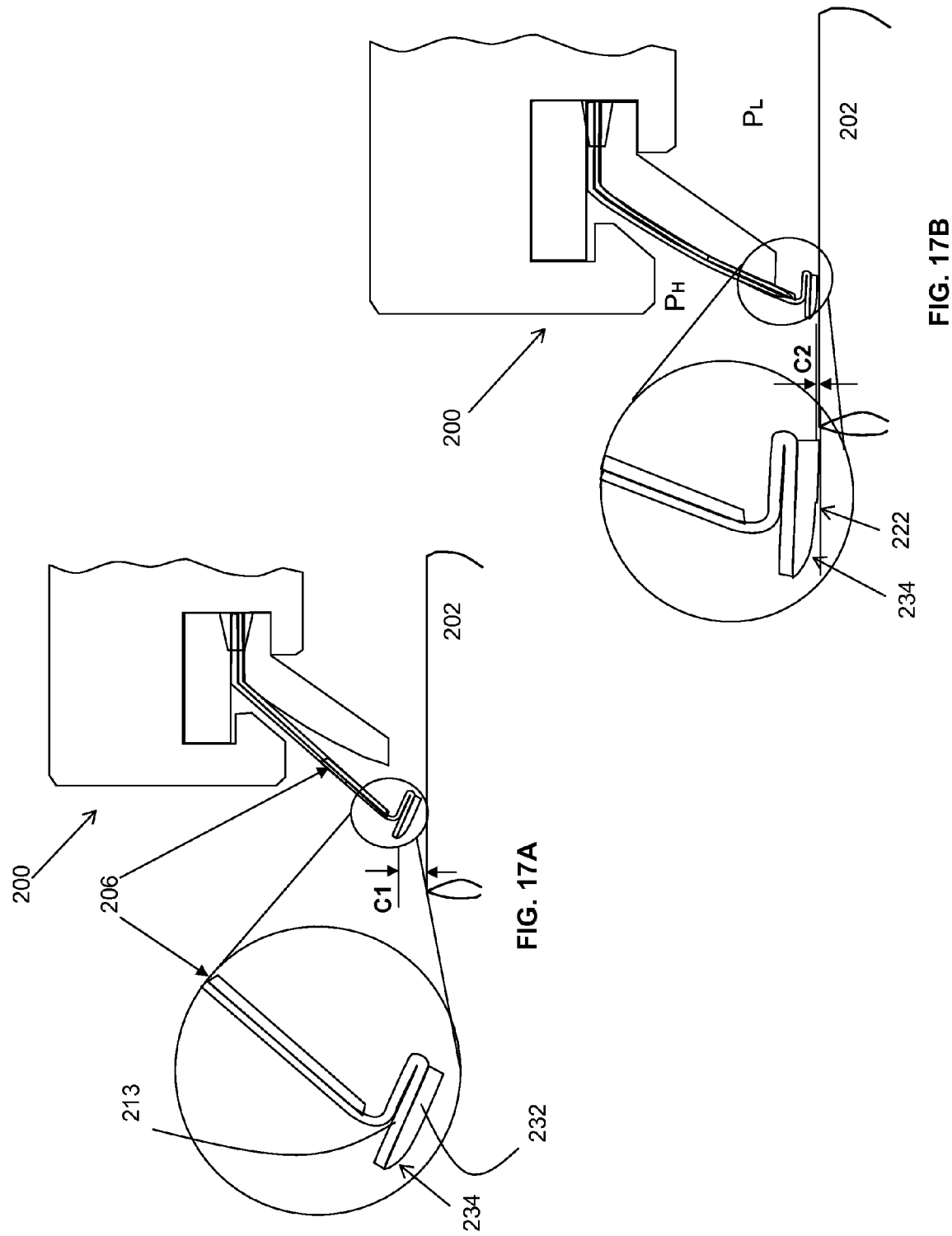

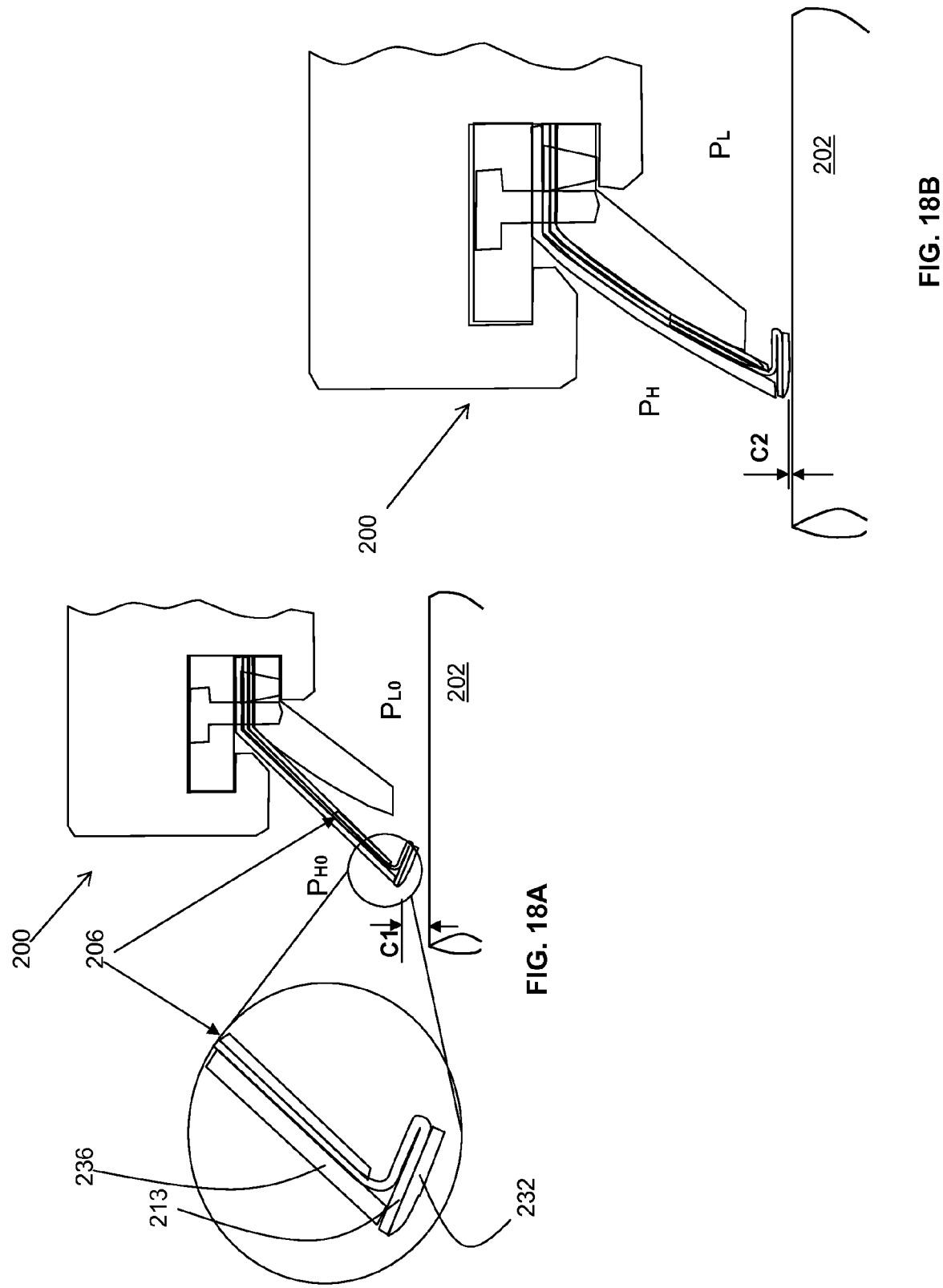

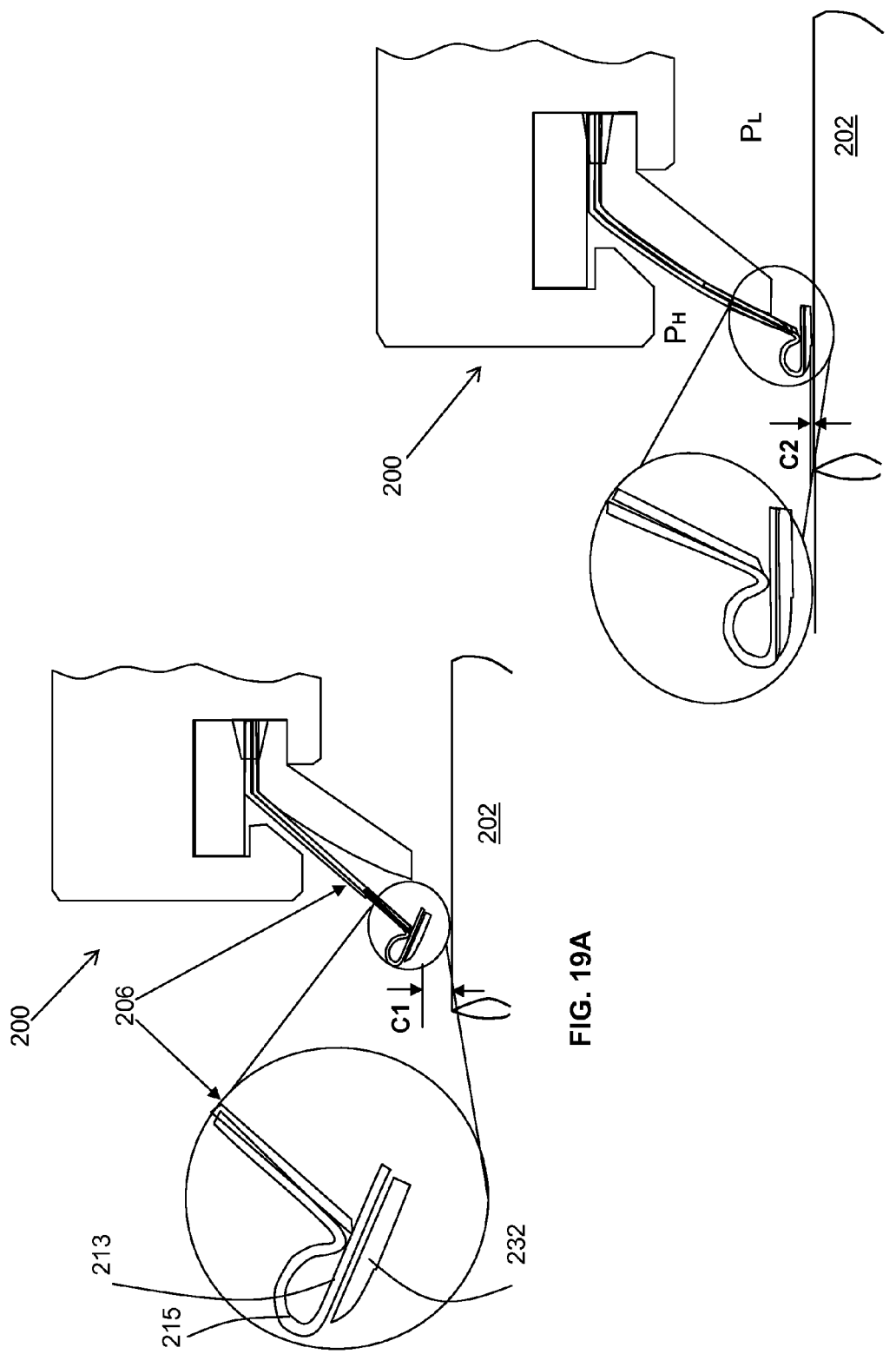

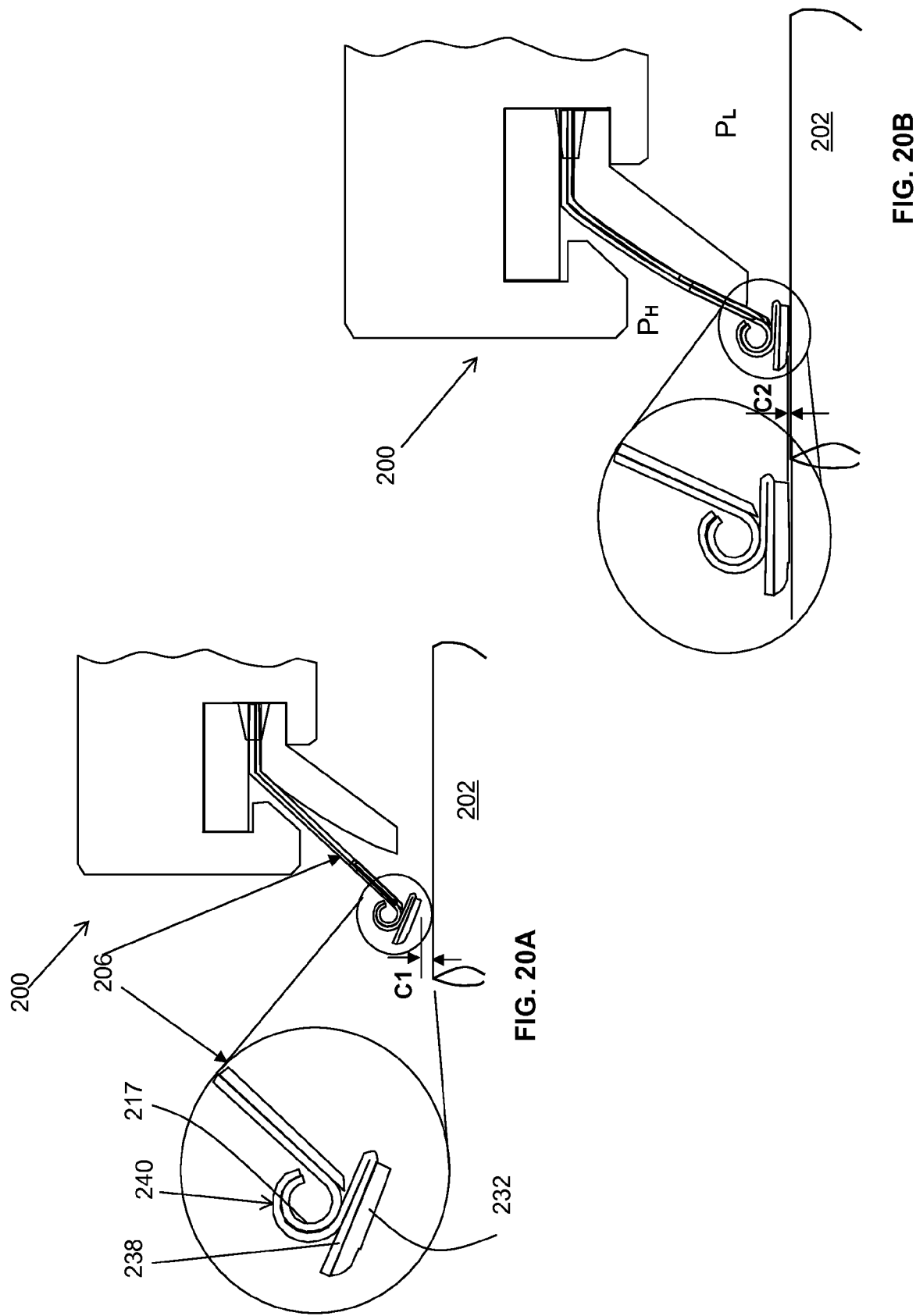

FILM RIDING PRESSURE ACTUATED LEAF SEAL ASSEMBLY

TECHNICAL FIELD

The present invention relates generally to seals for rotary machines and, more particularly, to a film riding pressure actuated leaf seal assembly.

BACKGROUND

In many rotary machines, such as a multi-stage centrifugal compressor or pump, a fluid is compressed by successive stages, or in turbines, a fluid is expanded in successive stages. Both turbine and compressor stage(s) have stationary or non-rotating components, e.g., vanes, cooperating with rotating components, e.g., blades, for compressing and expanding the operational fluid. The operational fluids change in pressure through the machine and a variety of seals are provided to preserve the differential pressures where necessary to maximize machine efficiency and performance. An illustrative seal may be provided between a turbine or compressor rotor and a cooperating stator or stator body so the rotor may be pressurized to provide thrust balance relative to the rearwardly directed force generated by the equipment and the forward direction of the equipment.

In the above-described settings, the seals used must address the close operating clearances required in machinery of this type. Rotary machine seal design also requires consideration of the relative motion between components produced by the differential thermal expansion and system pressure that occurs throughout the machinery operating cycle compared to shutdown clearance at assembly and transient rotor dynamic displacements traversing critical shaft speeds.

One structure commonly provided to control leakage flow along a turbine shaft or other rotating surface is a labyrinth seal. In this setting, a variety of blocking seal strips and obstructions are used between stationary turbine components. Solid labyrinth seals typically have a relatively large clearance to avoid rub damage. Labyrinth seals, therefore, do not maximize machine performance.

Another commonly used seal is a brush seal, which includes a pack of metal bristles that contact a rotor at free ends thereof to maintain a seal with the rotor. Brush seals have some resilience to accommodate rubbing against the rotating component. For instance, in U.S. Pat. No. 5,090,710, issued to Flower, a brush seal is comprised of closely packed fine wires or filaments that are weld assembled in a carrier assembly that is then inserted in a machine with the bristles wiping the rotating surface. The bristles and assembly are fabricated of materials suitable for the fluid temperature and, compared to a labyrinth seal, leakage is reduced through and past the bristles in close contact with the rotating surface.

Brush seals, however, pose a number of deficiencies. First, the multistep brush seal manufacturing process is costly. Second, brush seal bristles do not always maintain a close running clearance because of their inherent inability to withstand long term wear. Third, brush seals exposed to solid particles are subject to erosion or other deterioration. Finally, brush seals are also subject to vibration due to movement of the pressurized fluid being sealed. Therefore, brush seals oftentimes require dampening features.

According to U.S. Pat. Nos. 6,428,009, 7,182,345 and 7,410,173 issued to Justak and U.S. Pat. No. 5,026,252 issued to Hoffelner, brush seal designs with hydrodynamic shoes attached under the bristle ends of seal to reduce seal leakage are provided. Various arrangements and methods of attachment of brush seal components and hydrodynamic slider members are disclosed in these patents, however, robust integration and improved function is needed to achieve the reduced seal leakage objective of a hydrodynamic shaft seal. A particular deficiency in these designs is initial contact of the hydrodynamic shoes with the shaft until sufficient rotor speed is achieved during startup to produce the requisite film thickness to lift the shoes from rubbing contact with the shaft.

Another type seal is a finger seal, for example, those disclosed in U.S. Pat. Nos. 5,042,823 and 5,071,138, both issued to Mackay et al. These disclosures disclose a laminated finger seal providing a planar array of radially and circumferentially extending fingers separated by gaps. This structure suffers from a number of disadvantages. For instance, each stacked lamination is a complete ring (not segmented) and, therefore, is limited in application to machines that require installation/replacement of seals with the rotor removed from the unit.

In addition to the above-identified problems, brush seals and finger seals operating at close running clearance are subject to rubbing and wear when differential thermal expansion of stator and rotor components eliminates clearance altogether. For example, during a turbine shutdown, the stator component, in which a seal assembly is mounted, may cool more quickly than the rotor, causing the seal assembly to close on the rotor and rub. The force imposed during such a rub is reduced somewhat with the flexure of brush and finger seal members, but sliding friction nevertheless causes wear and reduces the life of such seals. Another example, in the aerospace area, is differential seal pressures at the compressor discharge of in aircraft engines during take-off can be three to four times higher than at idling or cruise conditions. High rotor speed and engine temperature during take-off increases the diameter of rotor seal surfaces, closing seal clearance and raises the opportunity for rubbing and wear.

One type of seal that addresses some of the deficiencies noted above for labyrinth, brush and finger seals is a leaf seal. Leaf seals are used to create a non-hermetic seal between abutting structural components in a turbo machine or other apparatus wherein a high pressure area is present on one side of the structural components and a low pressure area is present on the opposite side thereof. Leaf seals are typically relatively thin, compliant sections which may be manufactured to include narrow, precision slots to produce the desired seal member geometry. Where the structural components to be sealed are annular in shape, as in many components of turbo machines, segmented leaf seals are employed, i.e., relatively short, arcuate-shaped leaf seals which abut one another to form an essentially continuous annular seal between the structural components.

Regardless of the particular shape of the structural components to be sealed, leaf seals are movable between a closed, sealing position in which they engage (but not necessarily contact) each structural component and seal the space therebetween, and an open position in which at least one portion of the leaf seals disengage a structural component and allow the passage of gases in between such components.

An example of a seal assembly including leaf seals can be found in U.S. Pat. No. 7,578,509, and U.S. patent application Ser. No. 12/632,224, which are incorporated herein by reference. These patents disclose a plurality of metallic leaf seal members with each leaf seal member angled between their free ends and their fixed ends and a support member for supporting the angle. Seal member geometry is engineered with respect to thickness, width, length, and number of members to meet specific application requirements of differential pressure and anticipated differential motion. The support member serves to limit leaf seal member movement in one direction and withstand differential pressure, while a force imposed by a rubbing engagement on a rotating component is reduced with the elastic flexure of the seal assembly. Seal member end geometry may be shaped to provide a precision diameter.

SUMMARY OF THE INVENTION

In accordance with embodiments of this invention, a pressure actuated leaf seal assembly is provided that includes film riding, hydrodynamic/hydrostatic runners under seal member leaf ends. Leaf seal assemblies according to embodiments of this invention maintain the runner away from a rotating body until adequate rotating speed and differential pressure is present to generate lift required to allow the runner to float on a thin film of operating fluid on the rotating body, so that the runner does not rub the rotating body under transient or operating conditions. In addition, runners are attached to leaf seal members such that the runners move in a radial direction, while remaining nearly parallel to the rotating body. In one embodiment, a runner can comprise a separate structure coupled to a leaf seal member, and in another embodiment, a runner can comprise a wear-resistant pad on a distal end of a leaf seal member.

A first aspect of the invention provides a leaf seal assembly for use between a rotating component and a stationary component in a turbomachine, the leaf seal assembly comprising: a leaf seal including at least one set of leaf seal members, each leaf seal member having a planar surface having an areal dimension; and a runner coupled to a distal end of at least one leaf seal member of the at least one set of leaf seal members, wherein the at least one leaf seal member maintains the runner in a first position away from the rotating component in an unpressurized inoperative state and moves the runner to a second position, close to, but not contacting, the rotating component in a pressurized operative state.

A second aspect of the invention provides a leaf seal assembly for use between a rotating component and a stationary component in a turbomachine, the leaf seal assembly comprising: a leaf seal including at least one set of leaf seal members, each leaf seal member having a planar surface having an areal dimension, wherein the at least one set of leaf seal members is configured to move between a first position in an unpressurized inoperative state and a second position in a pressurized operative state, and wherein at least one leaf seal member of the at least one set of leaf seal members, includes a distal end angled such that at least one surface of the distal end is substantially parallel to the rotating component in the second position; a wear resistant pad positioned on the at least one surface of the distal end, such that in an unpressurized inoperative state, the at least one leaf seal member maintains the wear resistant pad away from the rotating component, and in the pressurized operative state, the at least one leaf seal member maintains the wear resistant pad close to, but not contacting, the rotating component.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein:

FIGS. 2-5 show cross-sectional views of a leaf seal assembly according to embodiments of this invention;

FIG. 14A shows a cross-sectional view of a leaf seal assembly according to an embodiment of this invention;

FIG. 14B shows an axial cross-sectional view, along line A-A, of FIG. 14A.

FIG. 15A shows a cross-sectional view of a leaf seal assembly according to an embodiment of this invention;

FIG. 15B shows an axial cross-sectional view, along line A-A, of FIG. 15A.

FIGS. 16A, 17A, 18A, 19A and 20A show cross-sectional views of a leaf seal assembly in a nonoperative state according to embodiments of this invention; and FIGS. 16B, 17B, 18B, 19B and 20B show cross-sectional views of a leaf seal assembly in an operative state according to embodiments of this invention.

DETAILED DESCRIPTION

Figure 1:
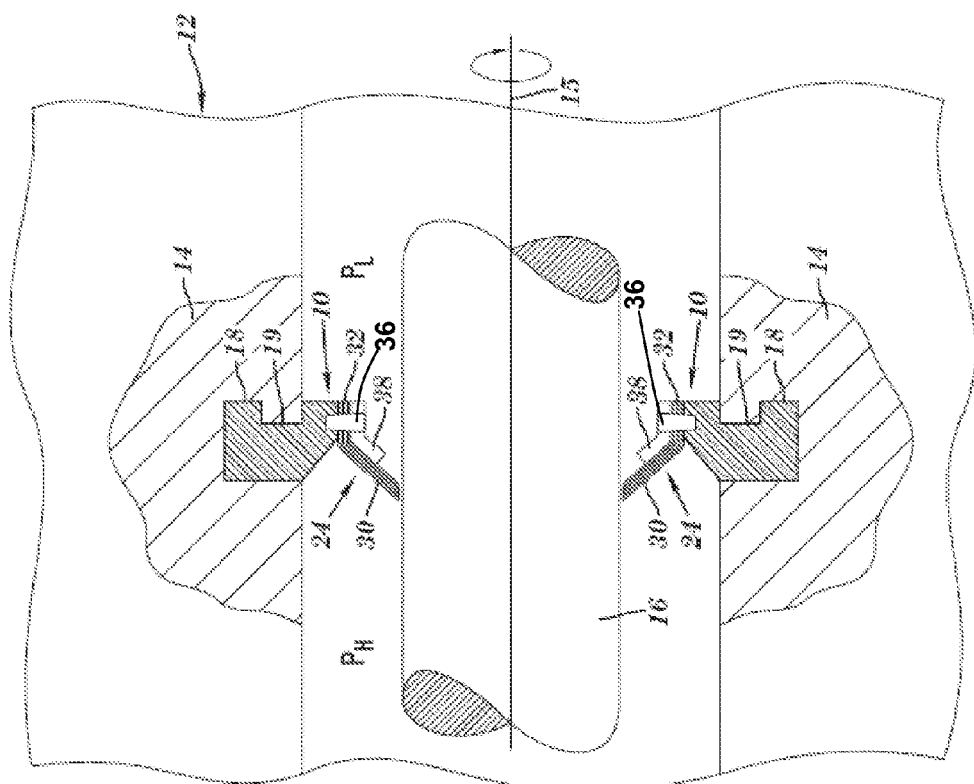
FIG. 1 shows a cross-sectional view of an illustrative leaf seal assembly for use in a turbomachine.

Referring to FIG. 1, a leaf seal assembly 10 for use with a rotary machine 12 including a plurality of leaf seal members 24 is shown. Leaf seal assembly 10 can be an assembly as disclosed in U.S. Pat. No. 7,578,509, which is incorporated by reference herein. Rotary machine 12 may be any well known machinery that includes a non-rotating component 14 and a rotating component 16 having a longitudinal axis 15, e.g., a centrifugal compressor, a pump or a steam turbine, etc. For description purposes, embodiments of the present invention will be described in terms of a centrifugal compressor or steam turbine having a stationary body or stator, 14 and a rotating component, or rotor, 16. As shown in FIG. 1, a higher pressure chamber $P_H$ and a lower pressure chamber $P_L$ are generated during steady state operation of rotary machine 12. Operating fluid of the turbine flows through the machine from a high pressure area $P_H$ to a lower pressure area $P_L$. Pressure from higher pressure area $P_H$ is exerted against at least part of seal assembly 10, which acts to seal higher pressure area $P_H$ from lower pressure area $P_L$. A number of arcuate seal assemblies 10, including a plurality of leaf seal members 24 having slots (not shown) therebetween, can be utilized about rotating component 16.

Leaf seal assembly 10 includes at least one set of leaf seal members 24. Leaf seal members 24 can be fabricated from shim stock with slots cut into an edge, forming leaf seal members that are angled at an acute angle from the uncut edge portion of the strip and wrapped into a frusto-conical shape about the seal longitudinal axis. Each set of leaf seal members 24 includes multiple layers of leaf seal members 24 which can be used to bear the differential pressure and, similar to the tabs of a roofing shingle, multiple leaf seal members 24 can be displaced from each other to block airflow through the slots. Thickness and number of layers are selected to meet application requirements of differential pressure and seal clearance closure objectives. A width of leaf seal member 24 is much greater than a thickness of leaf seal member 24, so leaf seal member 24 is essentially a flat cantilever beam for analysis of stress, i.e., leaf seal member has a planar surface having an areal dimension. Stress is kept well within the elastic limit and high cycle fatigue endurance limit over the entire operating temperature range.

Leaf seal members 24 each have a fixed end 32 and a free end 30, angled with respect to each other. The area between fixed end 32 and free end 30 is referred to as the knee, because it is where the bend of leaf seal member 24 is located. At fixed end 32, leaf seal members 24 are joined to a support member 38 having a side facing the high pressure side of seal assembly 10.

In cooperation with support member 38, leaf seal members 24 are designed to elastically deflect in response to system pressure. Support member 38 is located under leaf seal members 24 on a low pressure side. Support member 38 bears the upstream pressure applied to leaf seal members 24. The minor diameter of support member 38 is set close to rotating component 16 consistent with avoiding rubbing contact under all circumstances, similar to the 'fence height' in brush seal designs. Structurally, support member 38 is designed to carry the full differential pressure seal load. The upstream surface of support member 38 can include an arc that leaf seal members 24 conform to as differential pressure is applied. Contact with the arc surface of support member 38 displaces free ends 30 of leaf seal member 24 to a smaller radial height and smaller seal clearance. Arc length and radius determine the amount of change in seal clearance.

As also shown in FIG. 1, a backing ring 18 can also be included. Backing ring 18, to which support member 38 and leaf seal members 24 are welded, provides means of inserting seal segments into a machined stator slot surrounding rotating component 16. As shown in FIG. 1, a weld 36 may be provided through leaf seal members 24 and support member 38 to couple leaf seal members 24 and support member 38 to backing ring 18. Other connection mechanisms may also be employed.

In this case, as shown in FIG. 1, backing ring 18 is preferably non-rotatably held in a key slot 19 of non-rotating component 14 that is concentric with rotating component 16. As an alternative embodiment, however, seal assembly 10 may be provided as an annulus and leaf seal members 24 may be provided by a spiral of a single strip of material. While a particular structure has been disclosed for holding seal assembly 10, it should be recognized that a number of other mechanisms of mounting seal assembly 10 to non-rotating component 14 may be possible.

Figure 2:
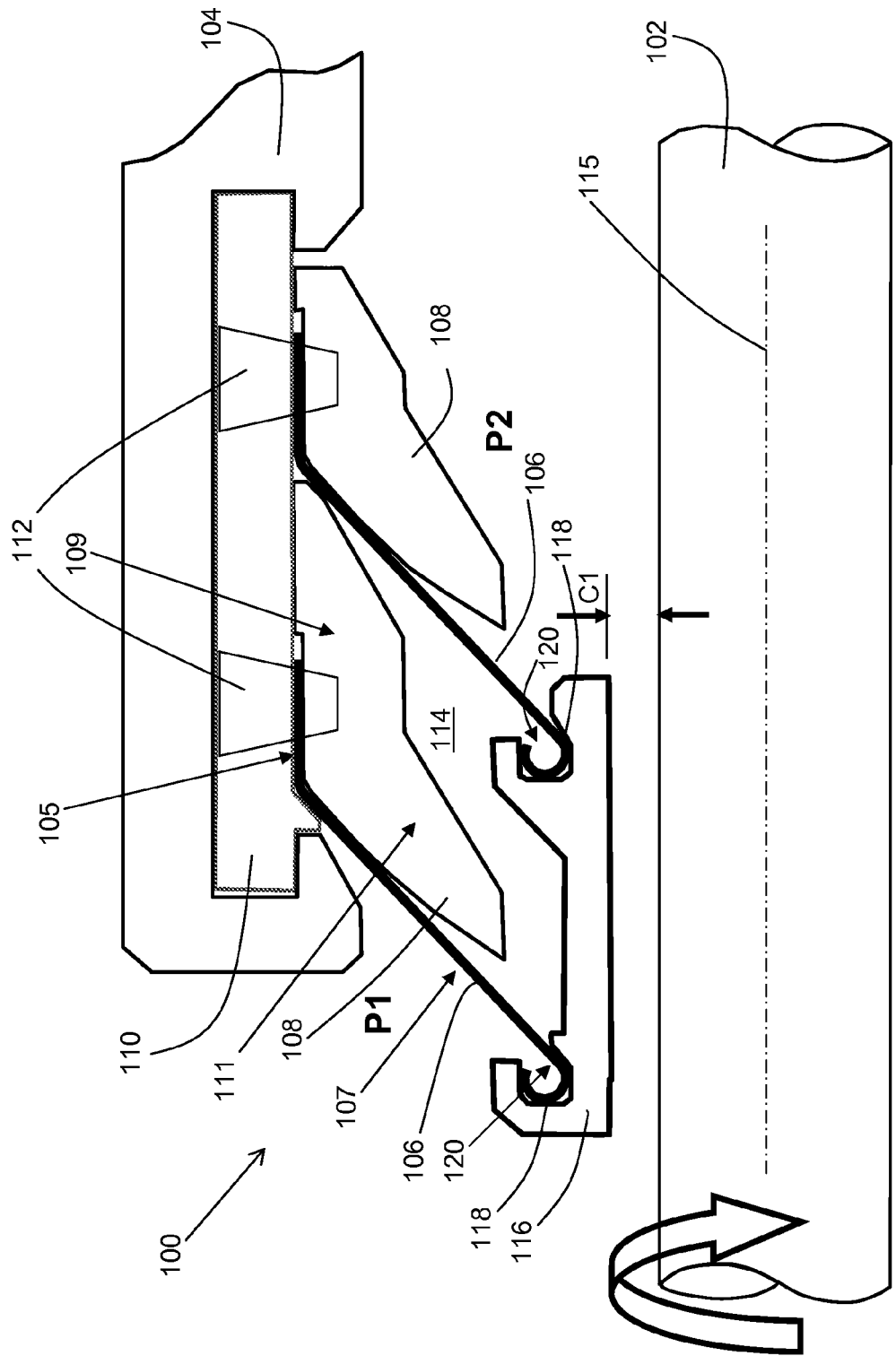
Figure 13:
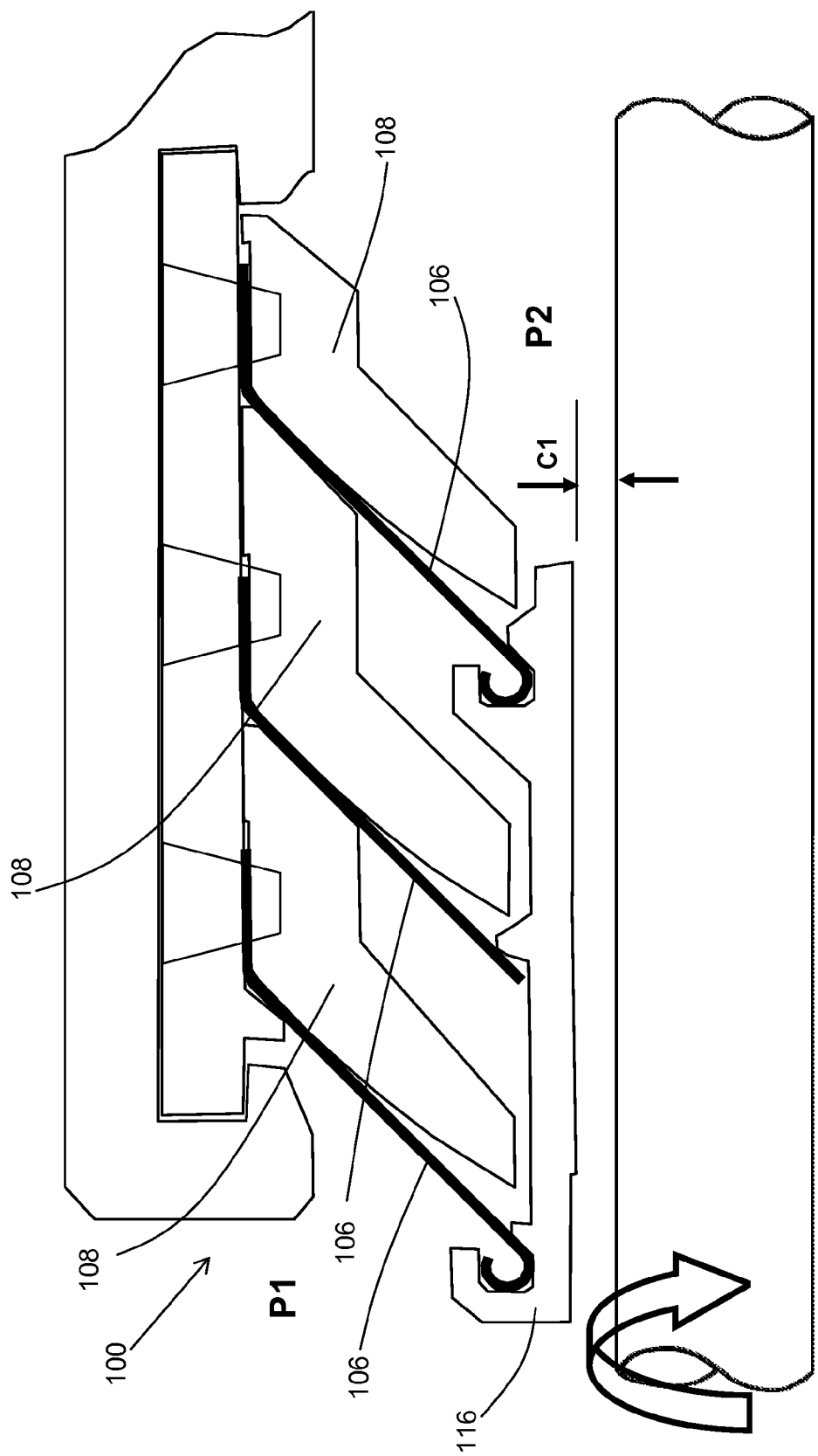

A leaf seal assembly 100 according to an embodiment of this invention is shown in FIG. 2. As in assembly 10, a leaf seal assembly 100 is utilized between a rotating component 102 and a stationary component 104. Leaf seal assembly 100 includes a leaf seal having at least one set of leaf seal members 106. Leaf seal assembly 100 shown in FIG. 2 has two axially spaced sets of leaf seal members 106, but it is understood that more or less sets of leaf seal members can be used, e.g., one set of leaf seal members 106 (FIG. 11) or three sets of leaf seal members 106 (FIG. 13). Each leaf seal member 106 has a planar surface having an areal dimension, as opposed to brush seals which consist of a plurality of thin bristles.

For ease of illustration, a set of leaf seal members 106 is sometimes shown in the figures as a single layer, or referred to herein in the singular as "leaf seal member 106." However, it is understood that "leaf seal member 106" can refer to a set of leaf seal members 106 that comprises multiple layers. For example, leaf seal members 106 can be fabricated from shim stock with slots cut into an edge, forming leaf seal members 106 that are angled at an acute angle from the uncut edge portion of the strip and wrapped into a frusto-conical shape about the seal longitudinal axis. Multiple layers of leaf seal members 106 can be used to bear the differential pressure and, similar to the tabs of a roofing shingle, multiple leaf seal members 106 can be displaced from each other to block airflow through the slots. Thickness and number of layers are selected to meet application requirements of differential pressure and seal clearance closure objectives. A width of leaf seal member 106 is much greater than a thickness of leaf seal member 106, so leaf seal member 106 is essentially a flat cantilever beam for analysis of stress, i.e., leaf seal member 106 has a planar surface having an areal dimension.

As in assembly 10 (FIG. 1), each leaf seal member 106 of leaf seal assembly 100 further includes a fixed end 105 and a free end 107, wherein free end 107 is angled with respect to fixed end 105. Leaf seal assembly 100 further includes a support member 108, located under leaf seal members 106 on a low pressure side PL of leaf seal assembly 100. Support member 108 includes a mount portion 109 that mounts support member 108 to stationary component 104 and a support portion 111 having a side facing a high pressure side of leaf seal 100. Support portion 111 is angled relative to mount portion 109. Fixed end 105 is mounted to support portion 111 of support member 108, while free end 107 is configured to move between a first position in an unpressurized inoperative state (FIG. 3) and a second position in a pressurized operative state (FIG. 4). Specifically, free end 107 of leaf seal member 106 contacts a distal end of support portion 111 in the pressurized operative state (FIG. 4) and is out of contact with the distal end of support portion 111 in the unpressurized inoperative state (FIG. 3).

Leaf seal assembly 100 can further include a backing ring 110 to which support member 108 and leaf seal members 106 are welded. A weld 112 may be provided through leaf seal members 106 and support member 108 to couple leaf seal members 106 and support member 108 to backing ring 110. Other connection mechanisms may also be employed.

While FIG. 2 shows fixed end 105 as substantially parallel with respect to a longitudinal axis 115 of rotating component 102, fixed end 105 can also be substantially perpendicular with respect to axis 115 of rotating component 102. (See, for example, configuration of free end 107 and fixed end 105 shown in FIG. 12). Leaf seal members 106 and support member 108 can comprise any known or later developed leaf seal assembly, including as disclosed in U.S. Pat. No. 7,587,509, which is incorporated herein by reference.

As shown in FIG. 2, leaf seal assembly 100 further includes a runner 116 at a distal end of free end 107 of at least one leaf seal member 106. Runner 116 is positioned between leaf seal members 106 and rotating body 102. Runner 116 can comprise a separate structure coupled to the distal end of at least one leaf seal member 106 (FIGS. 2-14B), or a wear resistant coating applied to a distal end of at least one leaf seal member 106 (FIGS. 15-19B), or a combination of a separate structure with a wear resistant coating (FIG. 7).

In one embodiment, shown in FIG. 2, a plurality of sets of leaf seal members 106 are provided, with the plurality of sets of leaf seal members 106 being axially spaced relative to rotating component 102. Each pair sets of leaf seal members 106 has a space 114 therebetween. For example, as shown in FIG. 2, two axially displaced sets of leaf seal members 106 can be provided, wherein each set of leaf seal members 106 engages runner 116. In this embodiment, a first upstream set of leaf seal members 106 (also referred to as sealing leaves) function primarily to block flow of an operating fluid of the turbomachine upstream of runner 116, and a second downstream set of leaf seal members 106 (also referred to as positioning leaves) function primarily to keep runner 116 nearly parallel to rotating component 102. As illustrated in FIG. 2, runner 116 can be coupled to both sets of leaf seal members 106, i.e., upstream and downstream sets of leaf seal members 106. As shown in FIG. 2, both sets of axially displaced leaf seal members 106 have substantially equivalent geometries, e.g., longitudinal lengths, such that runner 116 will remain substantially parallel as pressure acts on leaf seal members 106.

It is also understood that leaf seal members 106 can engage runner 116 by mechanical coupling, or by just contacting runner 116 in any other manner. In addition, as discussed herein, each leaf seal member 106 can comprise a set of leaf seal members 106, and one or more of the leaf seal members 106 in the set can engage runner 116.

As discussed in more detail herein, in connection with FIGS. 3-5, leaf seal member 106 maintains runner 116 in a first position away from rotating component 102 in an unpressurized inoperative state and moves runner 116 to a second position, close to, but not contacting, rotating component 102 in a pressurized operative state. As discussed herein, runner 116 will not rub rotating component 102 under transient or operating conditions. In addition, leaf seal member 106 is configured to maintain runner 116 substantially parallel to rotating component 102 in both the first position and the second position, i.e., in both the operative and inoperative states. In other words, leaf seal assembly 100 provides nearly parallel translation of runner 116 in a radial direction.

Leaf seal member 106 can be coupled to runner 116 in any known means of coupling two objects together, at any desired angle of contact. For example, as shown in FIG. 2, leaf seal member 106 can be coupled to runner 116 at an angle of more or less than approximately 90 degrees, i.e., leaf seal member 106 approaches runner 116 at an angle, rather than substantially perpendicularly. Leaf seal member 106 can include an extension 118 at a distal end of free portion 107. Extension 118, or distal end of free portion 107, can be shaped as desired to couple with runner 116. Preferably, leaf seal member 106 is pivotally coupled to runner 116, such that as leaf seal member 106 is deflected due to pressure from the operating fluid, runner 116 is able to pivot, with minimal radial clearance, to remain substantially parallel to rotating component 102. One means of creating this pivot coupling is shown in FIG. 2. For example, leaf seal members 106 can include a curled extension or end 118 at the distal end of free end 107, while runner 116 can include a pocket 120, also referred to as an ankle Curled end 118 can mate with pocket 120 such that runner 116 is pivotally coupled to leaf seal member 106 while allowing leaf seal member 106 to pivot relative to runner 116 as runner 116 is displaced radially. Other means of coupling leaf seal member 106 to runner 116 can also be used.

While runner 116 is shown in two-dimensional cross-section in FIG. 2, it is understood that runner 116 can include a plurality of arcuate runner segments circumferentially disposed about rotating component 102.

Turning to FIGS. 3-5, leaf seal assembly 100 is shown in operation. FIG. 3 shows seal assembly 100 in use during initial start-up of the turbomachine. In this state, pressure P1, a pressure upstream of leaf seal assembly 100, is substantially equivalent to pressure P2, a pressure downstream of leaf seal assembly 100. During this initial start up condition, differential seal pressure is low, and rotating component 102 is rotating at low or no speed. In this condition, leaf seal members 106 are not appreciably deflected and there is a large startup clearance, C1, between leaf seal members 106 (and attached runners 116) and rotating component 102. Stiffness of leaf seal members 106 is established by seal design to maintain adequate clearance as rotating component 102 goes through critical speeds. During startup, increasing system pressures generate hydrostatic lifting force and increasing speed of rotating component 102 generates hydrodynamic lift under runners 116 before they come into close clearance with rotating component 102. As illustrated in FIG. 3, the start-up large clearance, C1, provides a means of rub avoidance between runners 116 and rotating component 102. As rotating component 102 begins to increase its speed, leaf seal members 106 will continue to hold runner 116 away from rotating component 102 until a pressure condition as discussed herein occurs. Start-up clearance C1 can vary depending on the specific application, for example, C1 could be in the range of approximately 60 mils to approximately 100 mils for some seals in large gas turbines, while in other applications, such as some smaller compressor applications, C1 may only need to be approximately 5 mils to approximately 10 mils.

FIG. 4 shows leaf seal assembly 100 during normal operating conditions. In this state, pressure P1 is greater than pressure P2, and turbomachine operating fluid (such as gas or steam) flows from higher pressure area P1 to lower pressure area P2, between rotating component 102 and leaf seal assembly 100. As understood by one of skill in the art, counter balancing pressures are acting on runner 116, i.e., the higher pressure P1 that acts on leaf seal member 106 (and runner 116) pushes runner 116 radially toward rotating component 102. In addition, the pressure that acts on runner 116 from the operating fluid between rotating component 102 and runner 116, pushes runner 116 radially away from rotating component 102. The pressure condition discussed above occurs when these counter balancing pressures are balanced such that runners 116 are able to "float" on a film of operating load-supporting fluid on rotating component 102. In other words, pressure P1 will displace leaf seal member 106 and attached runner 116 toward rotating body 102, while that pressure is balanced by the hydrostatic and hydrodynamic lift from the pressure of the film passing between runner 116 and rotating body 102. Therefore, runner 116 is referred to as "film-riding" because it floats on the film of operating fluid, and as "hydrodynamic/hydrostatic" because the 'lift' experienced by runner 116 that enables it to float on the film is both hydrodynamic and hydrostatic in nature. As such, a small running clearance, C2, (for example, a few thousands of an inch) between runner 116 and rotating component 102 exists while the turbomachine is operating at normal running condition. Preferably, this clearance, C2, is large enough that runner 116 will not contact or rub rotating component 102, but small enough to still provide an adequate seal between runner 116 and rotating component 102. Accordingly, a thickness of the film of operating fluid in an operative state can be approximately 1 mils to 20 mils thick. As such, this operating clearance C2, in the pressurized operative state can be significantly less, e.g., approximately 90% less, than start-up clearance C1 in the unpressurized inoperative state.

Another benefit of the compliant film-riding seal assembly 100 disclosed herein, is that seal assembly 100 maintains an effective close clearance seal throughout an eccentric condition of rotating body 102 and stationary body 104. An eccentric condition can be the result of one or both of rotating component 102 and stationary component 104 moving radially with respect to each other, as illustrated in FIG. 5. For example, axis 115 of rotating component 102 can be initially aligned with an axis 117 of stationary component 104, but during an eccentric condition (shown in FIG. 5), rotating component 102 or stationary component 104 can move radially with respect to the other, such that axis 115 can become displaced from axis 117, for example, by a distance, E. As discussed herein, eccentricity can occur for several different reasons, such as manufacturing tolerance issues, vibration, thermal distortion of stationary body 104, misalignment during assembly or inertial displacement of mobile engine components. Traditional seals can be damaged during these eccentric conditions, so the compliant film-riding seal assembly 100 disclosed herein is desired to maintain an effective close clearance seal throughout the eccentric condition.

FIG. 5 also shows seal assembly 100 in an operative state, but in contrast to FIG. 4, FIG. 5 illustrates the position of runner 116 with large radial rotating component 102 eccentricity. The hydrodynamic/hydrostatic nature of film riding runner 116 allows seal assembly 100 to accommodate a range of rotating component 102 displacement relative to stationary component 104. Because runner 116 is out of contact with rotating component 102 in an inoperative state and only "floats" on the film of operating fluid on rotating component 102 in an operative state, as rotating component 102 or stationary component 104 is displaced (i.e., rotor/stationary component eccentricity), seal assembly 100 can accommodate that movement. As shown in FIG. 5, leaf seal member 106 is not deflected as far radially as in FIG. 4, because rotating body 102 is displaced closer to stationary component 104, but leaf seal member 106 and runner 116 still maintain a seal with a close clearance C3, without rubbing.

Figure 6:
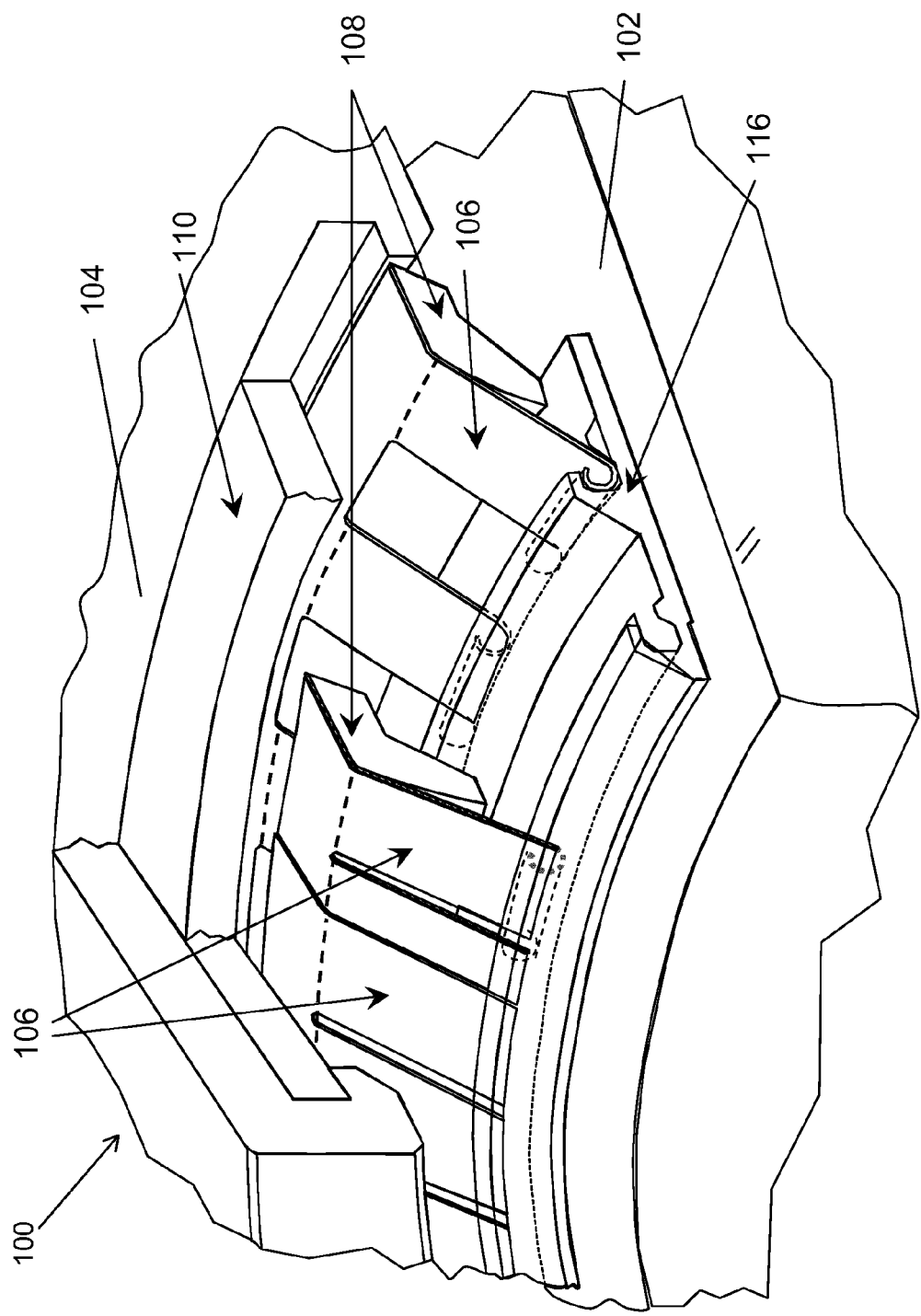
FIG. 6 shows a partial cutaway view of a leaf seal assembly according to an embodiment of this invention.
Figure 7:
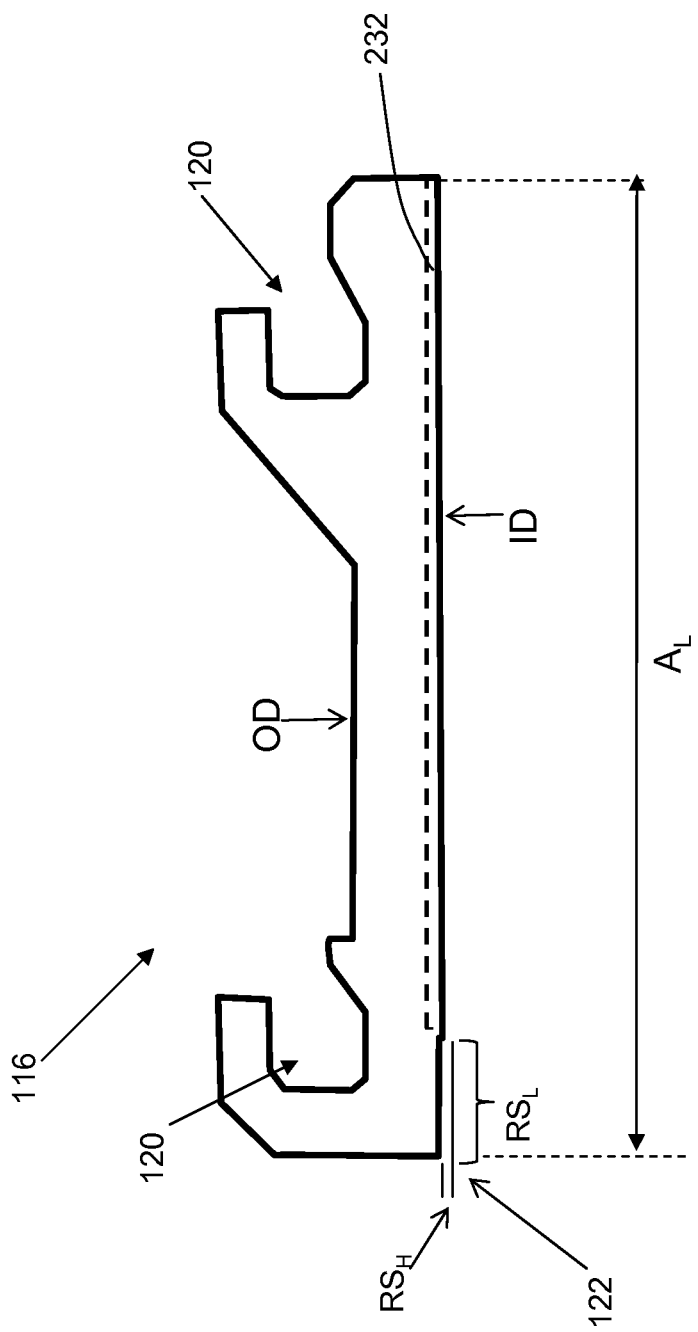
FIG. 7 shows a cross-sectional view of a runner for use in a leaf seal assembly according to an embodiment of this invention.

FIG. 6 is a cut-away illustration of the embodiment shown in FIGS. 2-5, with a plurality of leaf seal members 106 coupled to runner 116.

Runner 116 can comprise any shape or configuration in keeping with the embodiments of this invention disclosed herein. FIG. 7 shows one possible configuration of runner 116. As discussed herein, runner 116 as shown in FIG. 7 can include one or more pockets 120 to mate and couple with leaf seal members 106. Runner 116 can further include a Rayleigh step 122, preferably proximate to an upstream end of runner 116. Runner 116 can have an outer diameter (OD), inner diameter (ID) and axial length $A_L$ as desired. In one embodiment, OD can be approximately 60.35 inches, ID can be approximately 60.2 inches and $A_L$ can be approximately 1.5 inches. Rayleigh step 122 can also have a step height $RS_H$ and a step length $RS_L$ as shown in FIG. 7, for example, $RS_H$ can be approximately 0.010 inches and $RS_L$ can be approximately 0.30 inches. Rayleigh step 122 can act to trap operating fluid flowing from the higher pressure P1 to the lower pressure P2, and accelerate the velocity of the operating fluid. This increase in velocity and function of other operating fluid properties, e.g. viscosity, causes the film of operating fluid to exert enough pressure against runner 116 to keep it 'floating' on the film and not rubbing against rotating component 102. The load capacity of the film of operating fluid can be a function of several different factors, including the pressure across runner 116, axial length $A_L$ of runner 116, dimensions of Rayleigh step 122, inner diameter ID of runner 116 in relation to an outer diameter of rotating component 102, and the operating fluid properties of viscosity and density.

Runner 116 can comprise any desired material, depending on the type of turbomachine or application it is being used in. For example, for high temperature power generation or aero space applications, runner 116 could be a stainless steel or nickel base alloy. Where weight is of concern, for example, in aircraft engines, a nickel based alloy with high temperature strength, such as Inconel 718, could be used so that runner 116 can be of minimum thickness or cross-section. In power systems, runner 116 could be a 400 stainless steel or Nitronic 60 alloy that is known for anti-galling characteristic running against typical turbine shaft materials. Another benefit to using 400 stainless steel or Nitronic 60 alloys is that they are compatible with the various wear resistant coatings disclosed herein. In addition, vibration characteristics of the seal assembly can be influenced by the mass of runner 116 which can therefore influence material selection for runner 116. In lower temperature applications, e.g. centrifugal compressors, runner 116 may be an aluminum alloy for process gas compatibility.

Figures 8A, 8B:
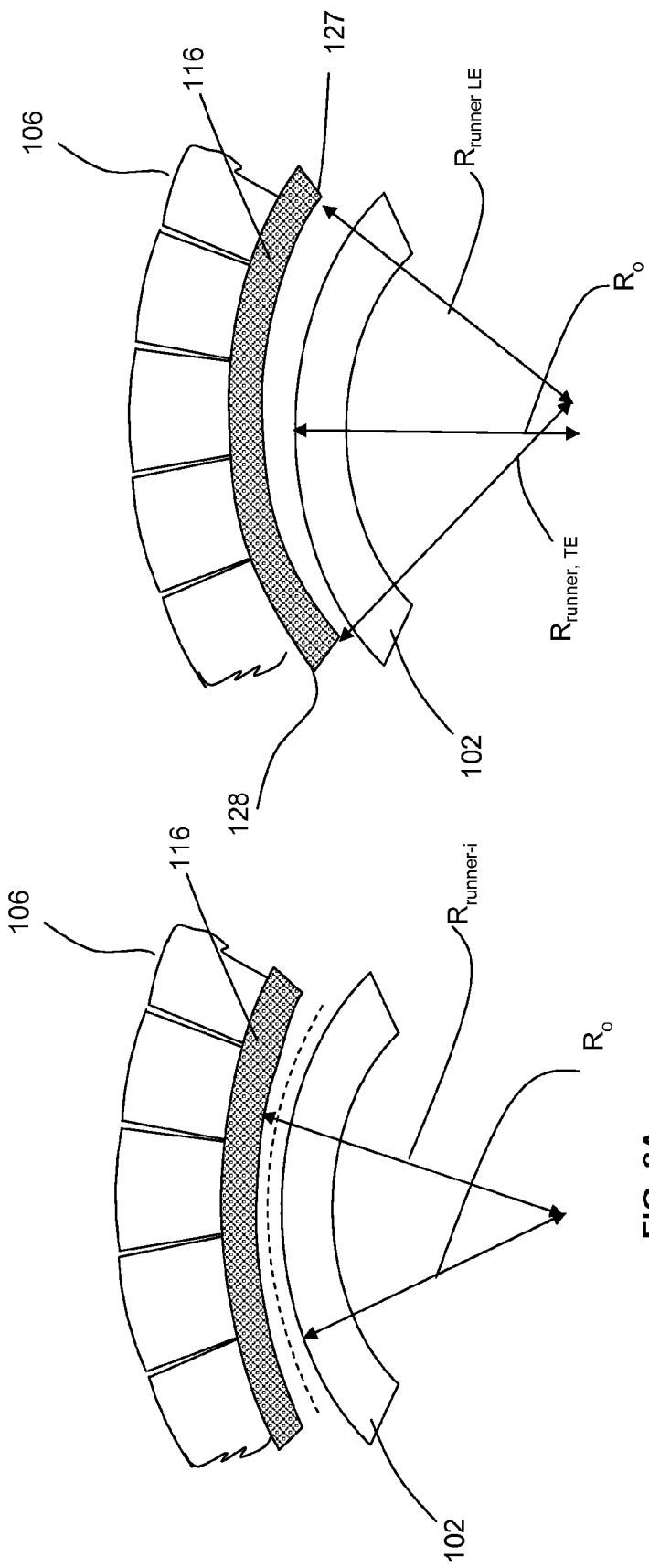
FIGS. 8A and 8B show partial axial views of a leaf seal assembly according to an embodiment of this invention.

FIGS. 8A and 8B show runner 116 with respect to rotatable component 102, in the radial plane. FIGS. 8A and 8B show two possible embodiments for balancing the forces acting on runner 116. In these embodiments, forces acting on runner 116 are balanced by altering a geometry of runner 116, for example by including cavities etched or machined on an inner side of runner 116 that are fed from the upstream, high pressure fluid source to enhance hydrodynamic lift, such as Rayleigh step 122 included on an inner side of runner 116 (as shown in FIG. 7). In another example, the geometry of runner 116 can be altered such that the operating fluid film flowing past runner 116 is wedge-shaped, with reducing thickness. Examples of two such possible geometries of runner 116 that result in a wedge shaped operating fluid film of reducing thickness, are shown in FIGS. 8A and 8B. In FIG. 8A, runner 116 can have an inner radius, $R_{runner\text{-}i}$, slightly greater than an outer radius, $R_o$, of rotatable component 102. This produces a squeezed film of operating fluids therebetween as runner 116 approaches rotatable component 102. In FIG. 8B, the machined center of runner 116 is displaced from the center of rotatable component 102, such that a leading edge radius, $R_{runner\text{-}LE}$ of runner 116 at a leading edge 127 can be greater than a trailing edge radius, $R_{runner,TE}$ of runner 116 at a trailing edge 128.

Figure 9:
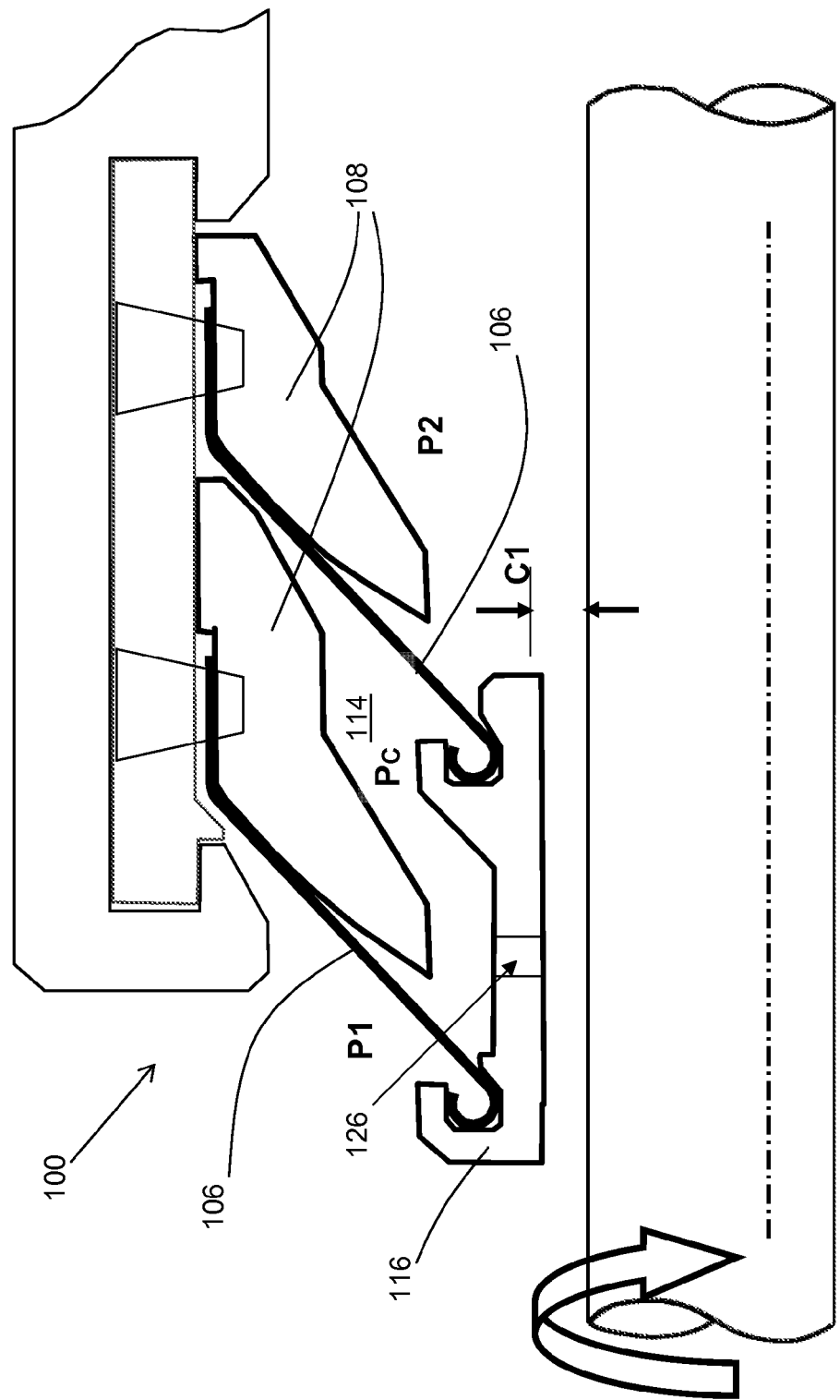
FIG. 9 shows a cross-sectional view of a leaf seal assembly according to an embodiment of this invention.
Figure 10:
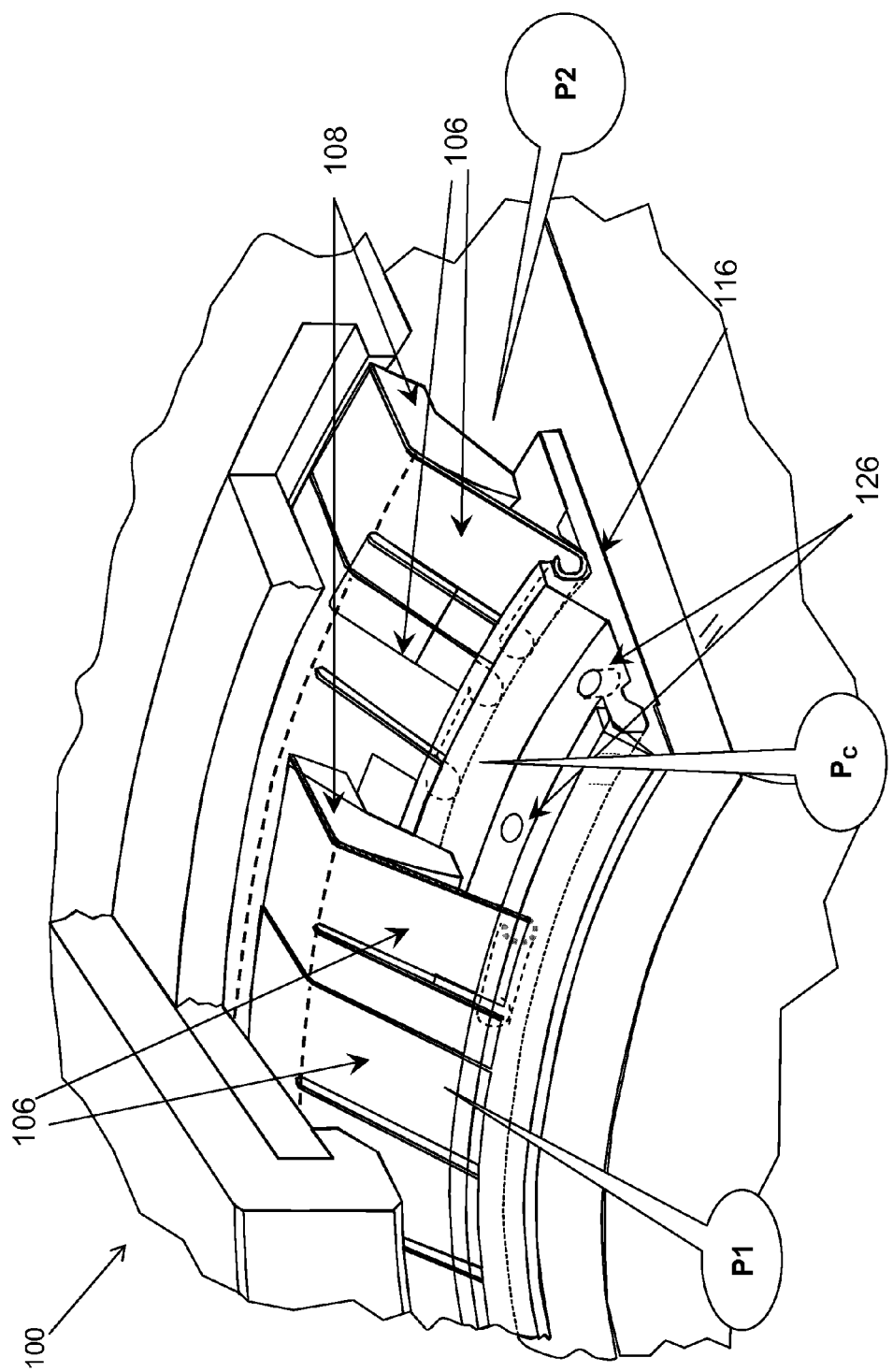
FIG. 10 shows a partial cutaway view of a leaf seal assembly according to an embodiment of this invention.

Another embodiment of leaf seal assembly 100 is shown in FIG. 9. In this embodiment, a plurality of axially spaced leaf seal members 106 are provided, with a space 114 therebetween. As shown in FIG. 9, a pair of axially spaced sets of leaf seal members 106 can be provided, with each set of leaf seal members 106 acting as pressure bearing seals. In this embodiment, runner 116 can include further one or more holes or openings 126 extending radially through runner 116. While one opening 126 is shown in FIG. 9, it is understood that more than one opening 126 is also disclosed (as shown in FIG. 10, discussed herein). Openings 126 are configured to allow operating fluid of the turbomachine to flow through runner 116 into space 114 between the plurality of leaf seal members 106. As discussed herein, in an operative state, pressure P1 upstream of leaf seal assembly 100 is higher than pressure P2 downstream of leaf seal assembly 100. Openings 126 allow operating fluid to flow into space 114 between leaf seal members 106 such that a pressure $P_C$ in space 114 comprises an intermediate pressure, less than pressure P1 and greater than pressure P2, for example, intermediate pressure $P_C$ can be substantially equivalent to an average of pressures P1 and P2. Thus, openings 126 provide a means of pressurizing space 114 between axially spaced sets of leaf seal members 106. Preferably, openings 126 are included in runner 116 at an axial location where the hydrostatic/hydrodynamic film pressure is substantially equivalent to a desired inter-leaf pressure.

FIG. 10 shows a cut-away illustration of the embodiment shown in FIG. 9, including a plurality of openings 126 in runner 116. As shown in FIG. 10, the plurality of openings 126 can be circumferentially spaced around the arcuate runner 116 segments.

Figure 11:
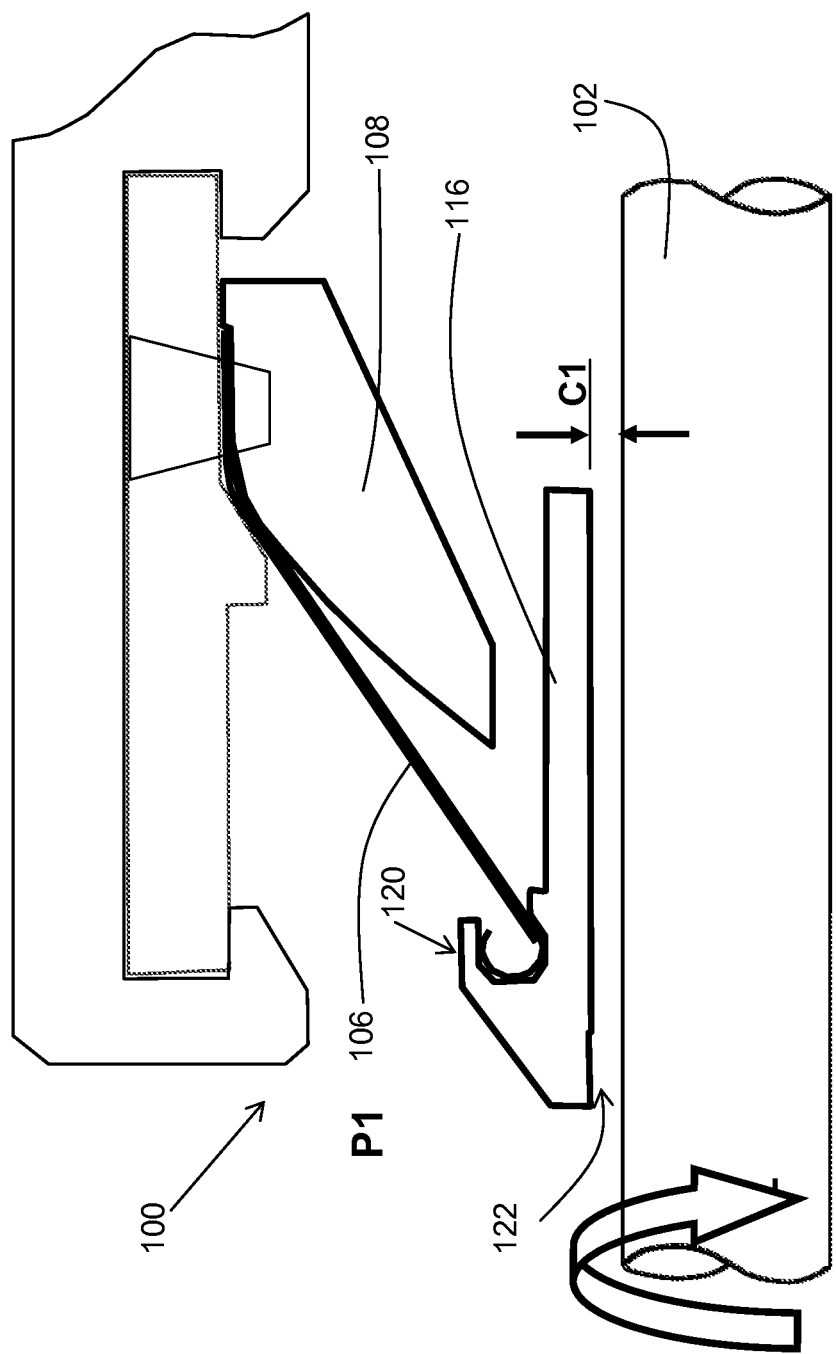
FIGS. 11-13 show cross-sectional views of a leaf seal assembly according to embodiments of this invention.

FIG. 11 shows an alternative embodiment of leaf seal assembly 100. In this embodiment, only one set of leaf seal members 106 are provided for each runner 116. Accordingly, runner 116 only includes one pocket 120 to pivotally couple with the one set of leaf seal members 106. In this embodiment, leaf seal members 106 act to both block operating fluid flowing through the turbomachine and to keep runner 116 substantially parallel to rotating component 102. The position of the leading edge of Rayleigh step 122 with respect to the forward sealing leaf ankle 120 of runner 116 also acts to balance forces acting on runner 116 from leaf seal members 106 and the operating fluid, to produce substantially parallel translation of runner 116.

Figure 12:
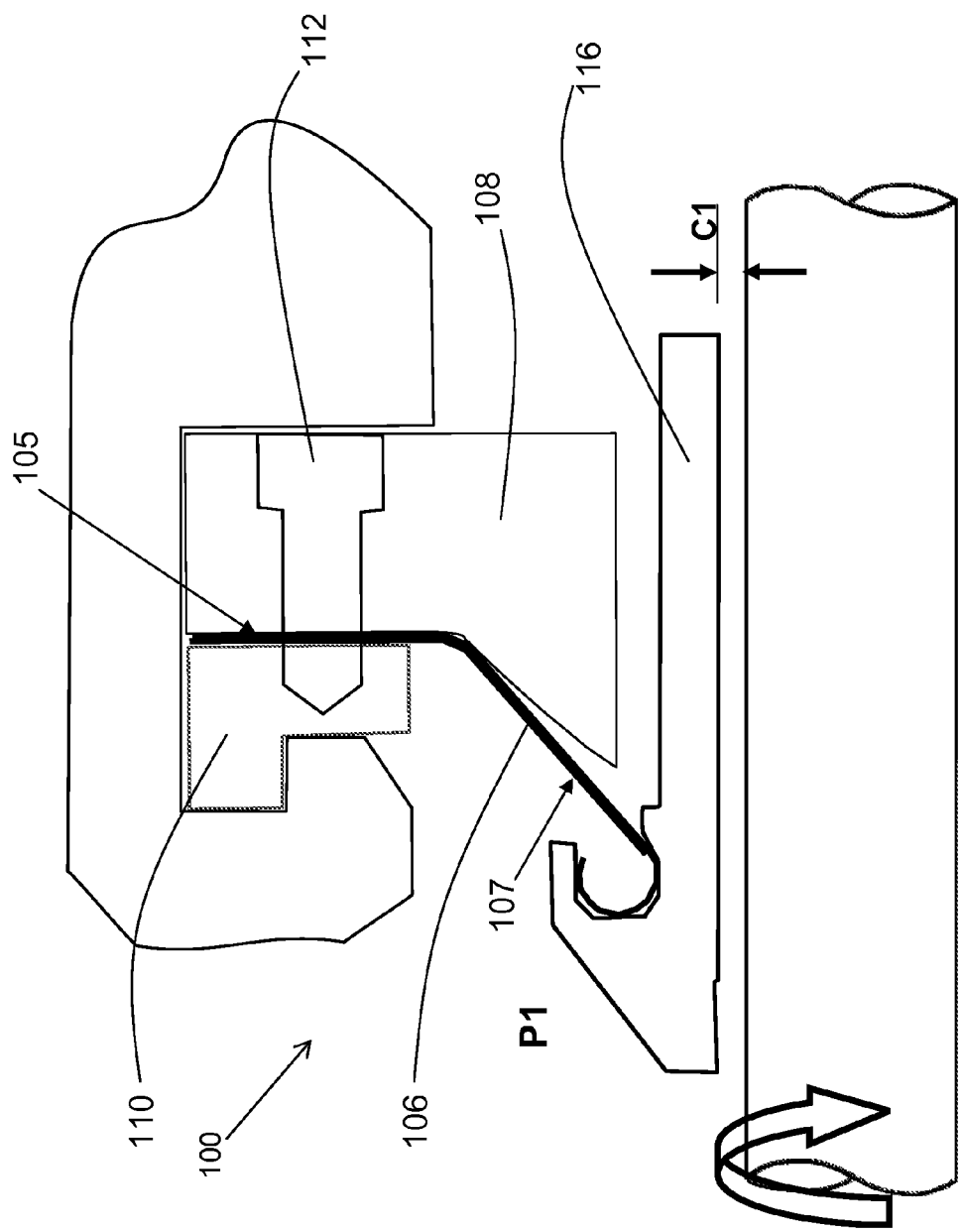

FIG. 12 shows another alternative arrangement of leaf seal members 106, backing ring 110 and support member 108. In this arrangement, fixed end 105 of leaf seal member 106 is substantially perpendicular to rotating component 102, as opposed to substantially parallel (as shown in FIGS. 1-11). As shown in FIG. 12, support member 108 is also oriented differently, to allow weld or screw 112 to couple support member 108 and leaf seal member 106 to backing ring 110. While FIG. 12 shows an embodiment with only one set of leaf seal members 106, it is understood that this configuration of leaf seal members 106 and support members 108 with respect to rotating component 102 is applicable to all other embodiments discussed herein, e.g., with a plurality of axially spaced sets of leaf seal members 106.

FIG. 13 shows another alternative embodiment of leaf seal assembly 100. In this embodiment, leaf seal member 106 comprises more than two sets of leaf seal members 106. For example, as shown in FIG. 13, three axially spaced sets of leaf seal members 106 are provided, an upstream set, a downstream set and an intermediate set positioned between the upstream set and the downstream set. In this embodiment, the upstream set of leaf seal members 106 and the downstream set of leaf seal members 106 are coupled to runner 116, while the intermediate set of leaf seal members 106 may contact runner 116, but is not necessarily coupled to runner 116. Accordingly, runner 116 includes at least two pockets 120 to pivotally couple with the two sets of leaf seal members 106.

In this embodiment, the intermediate set of leaf seal members 106 (also referred to as sealing leaves) function primarily to block flow of an operating fluid of the turbomachine upstream of runner 116, while the upstream and the downstream set of leaf seal members 106 (also referred to as positioning leaves) function primarily to keep runner 116 nearly parallel to rotating component 102. These three sets of leaf seal members 106 can be generally equally axially spaced, with the intermediate set of leaf seal members 106 axially placed approximately at the center of pressure under runner 116.

Another alternative geometry of a runner 216 and leaf seal members 106 is illustrated in leaf seal assembly 150 shown in FIGS. 14A-15B. In this embodiment, extension 118 of at least one leaf seal member 106 is planar and substantially parallel to rotating component 102. In this embodiment, leaf seal assembly 150 further includes at least one retaining strip 130 disposed on a face of runner 216 opposite rotating component 102, i.e., on an outer diameter (OD) surface of runner 216. Retaining strip 130 is coupled (i.e., welded or secured) to runner 216 such that at least one slot 132 is formed, between retaining strip 130 and runner 216, that leaf extensions 118 are configured to slip into. For example, retaining strip 130, as shown in FIGS. 14A-15B, can be a corrugated strip of material welded to the outer diameter surface of runner 216. Therefore, slots 132 are positioned and configured to matingly engage extensions 118 of a respective leaf seal member 106, to couple the respective leaf seal member 106 to runner 216. Slots 132 can be axial and extend circumferentially with respect to runner 216, and can be produced by shaped electrode electrical discharge machining (EDM). Slots 132 are best shown in the axial cross-sectional views shown in FIGS. 14B and 15B, and can be circumferentially angled as shown in FIGS. 14A-15B. This coupling of leaf seal members 106 and runner 216 (through retaining strip 130 and slots 132) allows leaf seal members 106 some limited circumferential movement, with respect to runner 216, as runner 216 changes radius with an application of pressure in an operative state. Retaining strip 130, and the coupling of extensions 118 in slots 132, imposes near parallel translation of runner 216 with respect to rotating component 102 when displaced by differential seal pressure. It is also understood that while retaining strip 130 is used to form slots 132 in the embodiments shown in FIGS. 14A-15B, in an alternative embodiment (not shown), instead of using a retaining strip, plunge EDM could be performed to create axial slots 132 on the OD face of runner 216, into which leaf seal members 106 could slip into.

A film-riding pressure actuated leaf seal assembly 200 according to another embodiment of the invention is shown in FIGS. 16A-20B. In this embodiment, instead of a separate structure, i.e., runner 116, 216, shown in FIGS. 2-15B, a wear resistant pad 232 is included on an extension 213 of leaf seal member 206. As previously discussed, the distal end of leaf seal member 206 is maintained in a first position away from rotating component 202 in an unpressurized inoperative state (FIGS. 16A, 17A, 18A, 19A and 20A) and moves to a second position, close to, but not contacting, rotating component 202 in a pressurized operative state (FIGS. 16B, 17B, 18B, 19B and 20B). When leaf seal member 206 is in the second position, wear resistant pad 232 is closer to rotating component 202 than when leaf seal member 206 is in the first position, i.e., clearance, C1 (FIGS. 16A, 17A, 18A, 19A and 20A), is larger in the first position than clearance C2 (FIGS. 16B, 17B, 18B, 19B and 20B) in the second position. As with runner 116 discussed in embodiments herein, pad 232 has hydrodynamic/hydrostatic film riding capability. In other words, pad 232 will 'float' on the film of operating fluid between rotating component 202 and leaf seal assembly 200. In use, there are times during operating of the turbomachine, when rotating component 202 may actually contact leaf seal assembly 200, despite the film of operating fluid. In those times, pad 232 ensures that rotating component 202 contacts pad 232, rather than steel leaf seal members 206.

Pad 232 can comprise a wear resistant coating material applied by known techniques, such as plasma or flame sprayed metal powder. A thickness of pad 232 can be approximately 0.02 inches. Any known thermal spray wear resistant material can be used for the coating material to meet specific design requirements, such as reduced friction in sliding contact with typical turbine shaft materials. Some examples of sprayed powder wear resistant materials that can be used to form pad 232 include: titanium carbide, nickel-aluminum composite and tungsten carbide. In another approach, pad 232 may be formed by spray or other deposition of a suitable alloy substrate of adequate thickness to machine hydrodynamic/hydrostatic features followed by deposition of a thin low friction wear resistant coating. These coatings are typically applied by a vapor deposition process and are less than approximately 0.001 inch in thickness. They can include solid lubricants such as molybdenum disulfide, polytetrafluoroethylene (PTFE), commonly known as Teflon®, and tungsten disulfide as well as titanium nitride and amorphous diamond wear coatings.

In this embodiment, wear resistant pad 232 is shown in FIGS. 16A-20B as being provided on an extension 213 of at least one leaf seal member 206. Extension 213 can be an integral part of a leaf seal member 206, such that leaf seal member 206 and extension 213 are a unitary piece of material that extends farther in a radial direction toward rotating component 202 than underlying leaf seal members. Extension 213 can alternatively be a separate piece of material that is coupled to leaf seal member 206 at a distal end. Either way, as with runner 116 discussed herein, extension 213 can be configured such that it provides requisite surface area for film-riding load capacity. Examples of different configurations are shown in FIGS. 16A-20B.

FIGS. 16A and 16B illustrate a first configuration of leaf seal member 206 and wear resistant pad 232. In this embodiment, extension 213 can comprise an angled distal end of a top leaf seal member 206, such that extension 213 is oriented substantially parallel to rotating component in an operative state (FIG. 16B). For example, as shown in FIGS. 16A and 16B, extension 213 can be angled towards rotating component 202, at approximately a 45 to 90 degree angle to the leaf seal member 206 from which it extends. Wear resistant pad 232 is positioned on a low pressure side of extension 213 of leaf seal member 206.

FIGS. 17A and 17B illustrate an alternative configuration of leaf seal member 206 and wear resistant pad 232. In this embodiment, extension 213 comprises a distal end of leaf seal member 206 that is angled at least twice to provide a thicker and/or longer surface for pad 232. For example, as shown in FIGS. 17A and 17B, extension 213 is angled first towards rotating component 202, at approximately a 45 to 90 degree angle to the leaf seal member 206 from which it extends. Then a portion of extension 213 can be angled a second time, such that it doubles back on itself, forming the longer, double layer surface for pad 232, as shown in FIGS. 17A and 17B. Again, the surface of extension 213 on which pad 232 is included, is substantially flat, and substantially parallel to rotating component 202 in an operative state. It is understood that instead of having a double angled distal end of leaf seal member 206, extension 213 can comprise one or more separate layers coupled to a distal end of leaf seal member 206 to provide the requisite surface for pad 232. Also shown in this embodiment (and equally applicable to other configurations discussed herein and shown in FIGS. 18A-20B), wear resistant pad 232 can include a Rayleigh step 222 to increase its film-riding capacity (as discussed above in connection with runner 116 in earlier embodiments). Film load capacity may also be enhanced by including an arced surface on an upstream face of pad 232, i.e., an entrance arc 234 machined in an inner diameter ID of wear resistant pad 232 as shown in FIGS. 17A and 17B.

FIGS. 18A and 18B illustrate another alternative configuration of leaf seal member 206 and wear resistant pad 232. In this embodiment, leaf seal members 206 and extension 213 are configured similar to the embodiment shown in FIGS. 17A and 17B, but in this embodiment, a polymer member 236 is also included, on a high pressure side of leaf seal member 206. This configuration is especially appropriate for lower temperature (i.e, approximately lower than 600 degrees Fahrenheit) conditions. A polymer member 236 can comprise a polymer member as disclosed in U.S. patent application Ser. No. 12/632,224, which is incorporated herein by reference.

FIGS. 19A and 19B illustrate another alternative configuration of leaf seal member 206 and wear resistant pad 232. In this embodiment, at least one leaf seal member 206 and extension 213 are configured similar to the embodiment shown in FIGS. 17A and 17B, but in this embodiment, extension 213 of leaf seal member 206 includes a curled section 215 on a high pressure side. This curled section 215 allows for a more flexible wear resistant pad 232. As shown in FIGS. 19A and 19B, extension 213 can first be angled away from rotating component 202, and a portion of extension 213 can be curled into a semi-circular shape. Then, a portion of extension 213 can be angled back towards rotating component 202, such that this portion forms a surface for pad 232. Again, as in earlier embodiments, a surface of extension 213 on which pad 232 is included, is substantially flat, and substantially parallel to rotating component 202 in an operative state.

FIGS. 20A and 20B illustrate another alternative configuration of leaf seal member 206 and wear resistant pad 232. In this embodiment, leaf seal member 206 includes a curled extension 217. Curled extension 217 mates with an articulating film riding pad attachment 238. Attachment 238 is positioned between extension 213 of leaf seal member 206 and rotating component 202. Attachment 238 can comprise any high strength alloy, including a similar material to leaf seal members 206, such as Haynes 25 or Inconel 718, but can also comprise a different material than leaf seal members 206. Attachment 238 includes a curled portion 240 that mates with curled extension 213, such that attachment 238 is allowed to rotate with respect to leaf seal member 206. Wear resistant pad 232 can be included on a side of attachment 238 opposite curled portion 240, that is substantially flat, and substantially parallel to rotating component 202 in an operative state.

While wear resistant pad 232 is discussed herein in connection with FIGS. 16A-20B, it is also understood that runner 116 discussed in connection with FIGS. 2-15B can further include a wear resistant coating, similar to wear resistant pad 232, along at least a portion of inner diameter of runner 116. An example of combining wear resistant pad 232 with a separate runner structure 116 can be seen in FIG. 7.

In addition, it is understood that as discussed in U.S. patent application Ser. No. 12/546,248, which is hereby incorporated by reference, seal assemblies 100, 200 can further include at least one damping leaf layer. Damping leaf layer can be provided on the low pressure, $P_L$, side of leaf seal members 106, between leaf seal members 106 and support member 108. As discussed in more detail in application Ser. No. 12/546,248, damping leaf layer can comprise a plurality of damping leaves which can be approximately 20% shorter in length and can have a different natural frequency than the leaf seal members 106 they are assembled in contact with. Damping leaves can also be of the same material and thickness as leaf seal members 106, resulting in a substantially higher natural frequency than the longer leaf seal members 106 which are subject to flow excitation.

While embodiments of this invention are discussed herein in connection with a turbomachine such as a steam or gas turbine, it is understood that embodiments of this invention are also applicable to any situation where a seal is needed between a rotating component and a stationary component. In addition, embodiments of this invention are especially applicable to any situation with extreme variations of speeds or operating conditions, such as start-up conditions for a turbomachine, a compressor, such as a centrifugal compressor, that operates at a range of speeds (part load or over load), or aircraft applications. In aircraft applications, effective seals are especially important given the extreme conditions and very high pressures involved in transient conditions, such as take-off.

It should also be recognized that the seal assemblies 100, 200 in accordance with the present invention may be combined with one or more labyrinth seals and/or one or more brush seals (not shown) to provide further sealing capacity.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced items. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 wt %, or, more specifically, about 5 wt % to about 20 wt %", is inclusive of the endpoints and all intermediate values of the ranges of "about 5 wt % to about 25 wt %," etc).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A seal assembly for use between a rotating component and a stationary component in a turbomachine, the seal assembly comprising:
   a leaf seal assembly including at least one set of leaf seal members, each leaf seal member having: a planar surface having an areal dimension; and
   a distal end positioned adjacent the planar surface, wherein the distal end of at least one of the set of leaf seal members includes a curled end;
   a runner pivotally coupled to the distal end of at least one leaf seal member of the at least one set of leaf seal members, the runner including at least one pocket for pivotally engaging the curled end of the at least one of the set of leaf seal members,
   wherein the at least one leaf seal member maintains the runner in a first position away from the rotating component in an unpressurized inoperative state and moves the runner to a second position, close to, but not contacting, the rotating component in a pressurized operative state.

2. The seal assembly of claim 1, wherein the at least one leaf seal member is configured to maintain the runner substantially parallel to the rotating component in both the operative and inoperative states.

3. The seal assembly of claim 1, wherein a clearance between the runner and the rotating component in the pressurized operative state is approximately 90% less than a clearance between the runner and the rotating component in the unpressurized inoperative state.

4. The seal assembly of claim 1, wherein the runner includes a plurality of arcuate runner segments circumferentially disposed about the rotating component.

5. The seal assembly of claim 1, wherein the at least one set of leaf seal members includes a plurality of sets of leaf seal members, the plurality of sets of leaf seal members being axially spaced relative to the rotating component, each pair of sets of leaf seal members having a space therebetween.

6. The seal assembly of claim 5, wherein each set of leaf seal members includes a substantially equal longitudinal length, and wherein at least one leaf seal member in each set of leaf seal members is coupled to the runner.

7. The seal assembly of claim 1, wherein the curled end pivotally engages the at least one pocket such that the runner is pivotally coupled to the at least one leaf seal member while allowing the at least one leaf seal member to pivot relative to the runner.

8. The seal assembly of claim 1, wherein, in the pressurized operative state, the runner floats on a film of operating fluid of the turbomachine between the runner and the rotating component.

9. The seal assembly of claim 8, wherein a thickness of the film of operating fluid is approximately 1 mils to approximately 20 mils.

10. The seal assembly of claim 1, wherein the runner includes a Rayleigh step proximate to an upstream end of the runner.

11. The seal assembly of claim 1, wherein the runner comprises one of the following materials: a stainless steel or a nickel-based alloy.

12. The seal assembly of claim 1, wherein an inner radius of the runner is greater than an outer radius of the rotating component.

13. The seal assembly of claim 1, wherein a radius at a leading edge of the runner is greater than a radius at a trailing edge of the runner.

14. A seal assembly for use between a rotating component and a stationary component in a turbomachine, the seal assembly comprising:
   a leaf seal assembly including at least one set of leaf seal members, wherein at least one leaf seal member of the at least one set of leaf seal members includes a curled end; and
   a runner pivotally coupled to the curled end of the at least one leaf seal member of the at least one set of leaf seal members, the runner including at least one pocket for pivotally engaging the curled end,
   wherein the at least one leaf seal member maintains the runner in a first position away from the rotating component in an unpressurized inoperative state and moves the runner to a second position, close to, but not contacting, the rotating component in a pressurized operative state.

15. The seal assembly of claim 1, wherein each of the at least one set of leaf seal members include a curled end, and wherein the runner includes two pockets for pivotally engaging the curled end of each of the at least one set of leaf seal members.

* * * * *